(12) United States Patent
Miyoshi et al.

(10) Patent No.: US 8,396,067 B2
(45) Date of Patent: Mar. 12, 2013

(54) ADDRESS LEARNING METHOD AND ADDRESS LEARNING SWITCH

(75) Inventors: Takashi Miyoshi, Kawasaki (JP); Takeshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 12/814,876

(22) Filed: Jun. 14, 2010

(65) Prior Publication Data

US 2010/0316053 A1 Dec. 16, 2010

(30) Foreign Application Priority Data

Jun. 15, 2009 (JP) ................................. 2009-141874

(51) Int. Cl.
*H04L 12/28* (2006.01)
(52) U.S. Cl. ....................................... 370/392; 370/389
(58) Field of Classification Search ........................ None
See application file for complete search history.

(56) References Cited

U.S. PATENT DOCUMENTS

2010/0316053 A1* 12/2010 Miyoshi et al. ............... 370/392

FOREIGN PATENT DOCUMENTS

JP 11-150553 6/1999

* cited by examiner

*Primary Examiner* — Robert Wilson
(74) *Attorney, Agent, or Firm* — Staas & Halsey LLP

(57) ABSTRACT

A switch operating in a multistage switch network is provided. The switch includes a plurality of ports, a first processor for processing a source address and a destination address of a packet received by the plurality of ports, and a second processor for including a memory storing data of the packet, and for outputting, under the control of the first processor, the data of the packet stored on the memory, wherein the first processor calculates a hash value of the source addresses of the packet in accordance with a specific hash function, identifies a output port connected to a switch that corresponds to the hash value and is to learn the source address, and causes the second processor to output the data of the packet to the output port.

16 Claims, 20 Drawing Sheets

FIG. 5

| MAC ADDRESS | OUTPUT PORT NUMBER |
|---|---|
| ⋮ | ⋮ |
| 00:00:01:23:45:67 | PORT B |
| ⋮ | ⋮ |
| 00:00:89:ab:cd:ef | PORT B |
| ⋮ | ⋮ |
| hasha | PORT A |
| hashb | PORT C |
| ⋮ | ⋮ |

FIG. 7

| DA(12Byte) | SA(12Byte) | Tag (4B) | Type (4B) | PAYLOAD | FCS (4B) |

FIG. 9

| MAC ADDRESS | OUTPUT PORT NUMBER |
|---|---|
| ⋮ | ⋮ |
| 00:00:01:23:45:42 | PORT C |
| ⋮ | ⋮ |
| 00:00:00:11:22:22 | PORT A |
| ⋮ | ⋮ |
| 00:00:89:ab:cd:fe | PORT B |
| ⋮ | ⋮ |

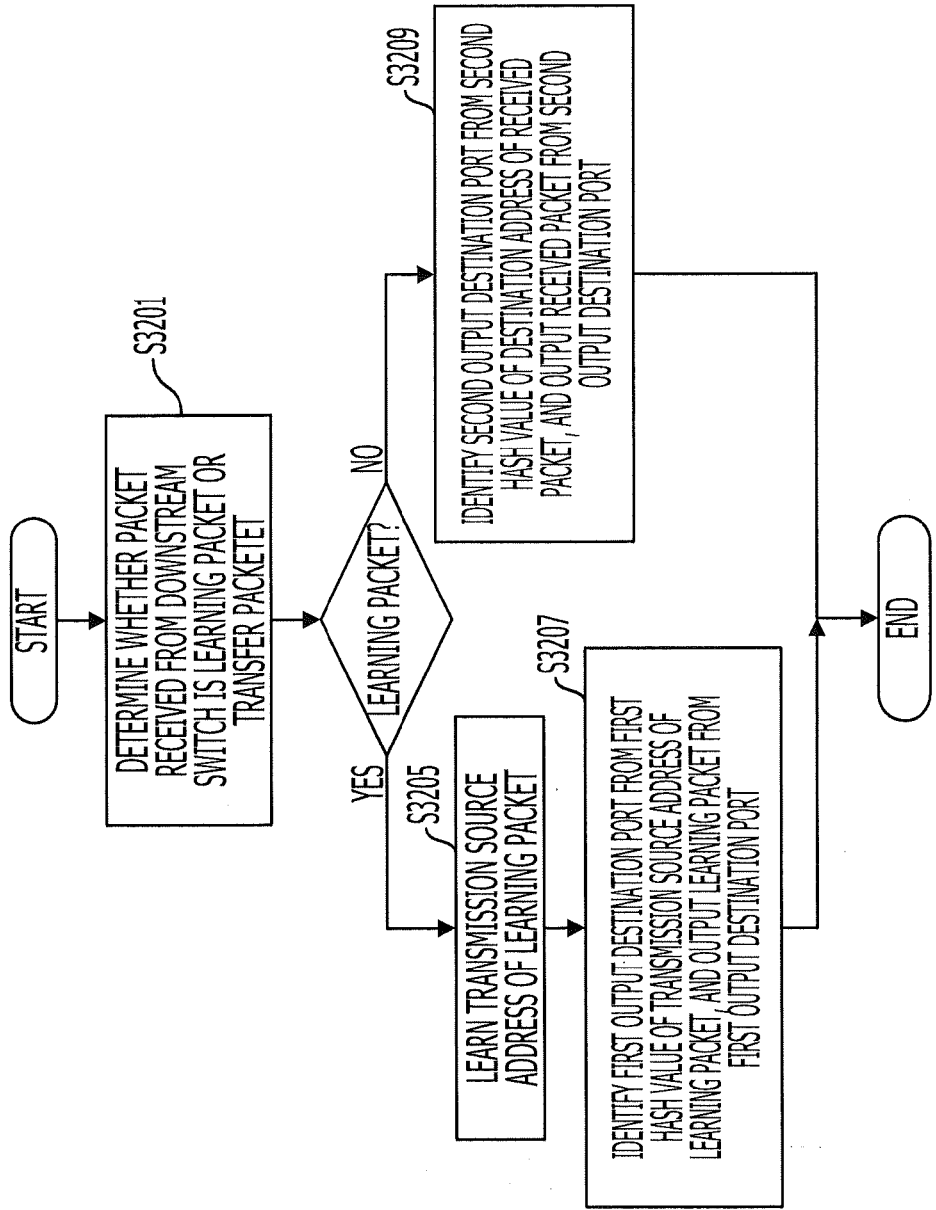

ADDRESS LEARNING METHOD AND ADDRESS LEARNING SWITCH

CROSS-REFERENCE TO RELATED APPLICATION(S)

This application is related to and claims priority to Japanese Patent Application No. 2009-141874, filed on Jun. 15, 2009, incorporated herein by reference.

BACKGROUND

1. Field

The embodiments discussed herein are directed to address learning of switches that have multiple-stage relation of connection.

2. Description of the Related Art

A network topology illustrated in FIG. 1 may be used to connect switches in a multistage configuration as in FAT tree. Referring to FIG. 1, a network may be connected in a two-stage configuration and includes lower stage leaf switches SW1 through SWm and upper stage root switches SW through SWn. Each of the leaf switches is respectively connected to each of the root switches SW1 through SWm. Each of the leaf switches may be connected to each of the terminal devices of any number. Referring to FIG. 1, k1 terminal devices T(1-1) through T(1-k1) are connected to the leaf switch SW1. The remaining leaf switches are simply not illustrated, and each of the remaining leaf switches SW1 through SWm may be connected to a total of k terminal devices.

A packet may be transmitted from the terminal device T(1-1) to the terminal device T(m-km) in such a network, for example. The leaf switch SW1 receives the packet from the terminal device T(1-1), and then transfers the packet to the root switch SWm. The root switch SW1 transfers the received packet to the leaf switch SWm. The leaf switch SWm outputs the packet to the terminal device T(m-km). Since the network illustrated in FIG. 1 is redundant, the leaf switch SW1 may transfer the packet to any of the root switches. To distribute workload, the transfer destination of the packet may be limited to the root switch SW1, for example. If a plurality of root switches can transfer packets to the terminal device T(1-1), the plurality of root switches need to learn an address of the terminal device T(1-1) in order to avoid flooding. In other words, the root switches SW1 through SWn need to hold the address of the terminal device in a redundant fashion. The root switches SW1 through SWn thus need to store a large number of addresses as terminal devices increase in number. A memory capacity of each root switch is subject to a limitation, which in turn limits the number of terminal devices.

A switching hub configured as discussed below is available to reduce the capacity of an address table. The switching hub includes a plurality of terminal communication local-area network (LAN) ports, and switching communication LAN ports, a switching controller for controlling switching of a plurality of terminals, a virtual LAN (VLAN) controller for separating a LAN into a plurality of networks according to setting, and an address table manager for managing an address table within a switch. The switching hub connects a plurality of LANs that use carrier sense multiple access/collision detection (SCMA/CD) as an access control protocol for a transfer medium. The switching hub performs concurrently a relay operation on the ports, and divides the LAN into a plurality of networks. The switching hub further includes an inter-switch address manager for distributing an address table in a VLAN among the switches, a VLAN ID processor for adding to or deleting from a relay frame an ID identifying which of the VLANs a frame belongs to, and an intra-VLAN transfer processor for transferring a frame within the same VLAN. Such a switching hub is effective in a cascade connected configuration, but not effective in the network illustrated in FIG. 1.

SUMMARY

It is an aspect of the embodiments discussed herein to provide a switch, an address learning method.

The above aspects can be attained by a system including a plurality of ports, a first processor for processing a source address and a destination address of a packet received by the plurality of ports, and a second processor for including a memory storing data of the packet, and for outputting, under the control of the first processor, the data of the packet stored on the memory, wherein the first processor calculates a hash value of the source addresses of the packet in accordance with a specific hash function, identifies a output port connected to a switch that corresponds to the hash value and is to learn the source address, and causes the second processor to output the data of the packet to the output port.

The above aspects can be attained by a method including processing a source address and a destination address of a packet received by the plurality of ports, calculating a hash value of the source addresses of the packet in accordance with a specific hash function, identifying a output port connected to a switch that corresponds to the hash value and is to learn the source address, causing the second processor to output the data of the packet to the output port, and including a memory storing data of the packet, and for outputting the data of the packet stored on the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 illustrates exemplary data stored on a forwarding data base (FDB) in the switching LSI of the leaf switch.

FIG. 7 illustrates a packet format of a learning packet in accordance with the first embodiment.

FIG. 9 illustrates exemplary data stored on the FDB in the switching LSI in the root switch.

FIG. 20 illustrates a process flow of a process in accordance with a sixth exemplary embodiment.

DETAILED DESCRIPTION OF EMBODIMENTS

Figure 1:
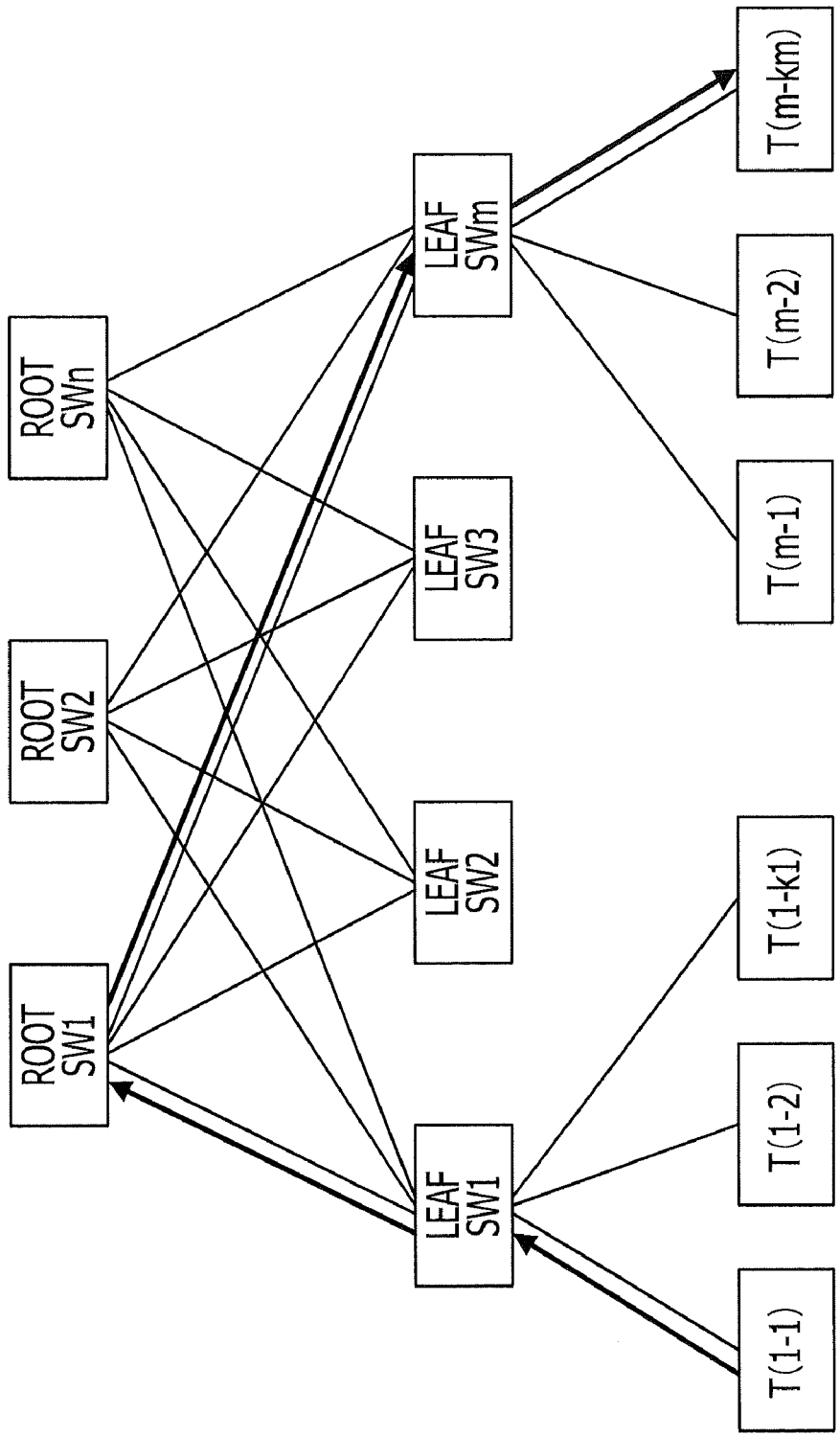
FIG. 1 illustrates related art.
Figure 2:
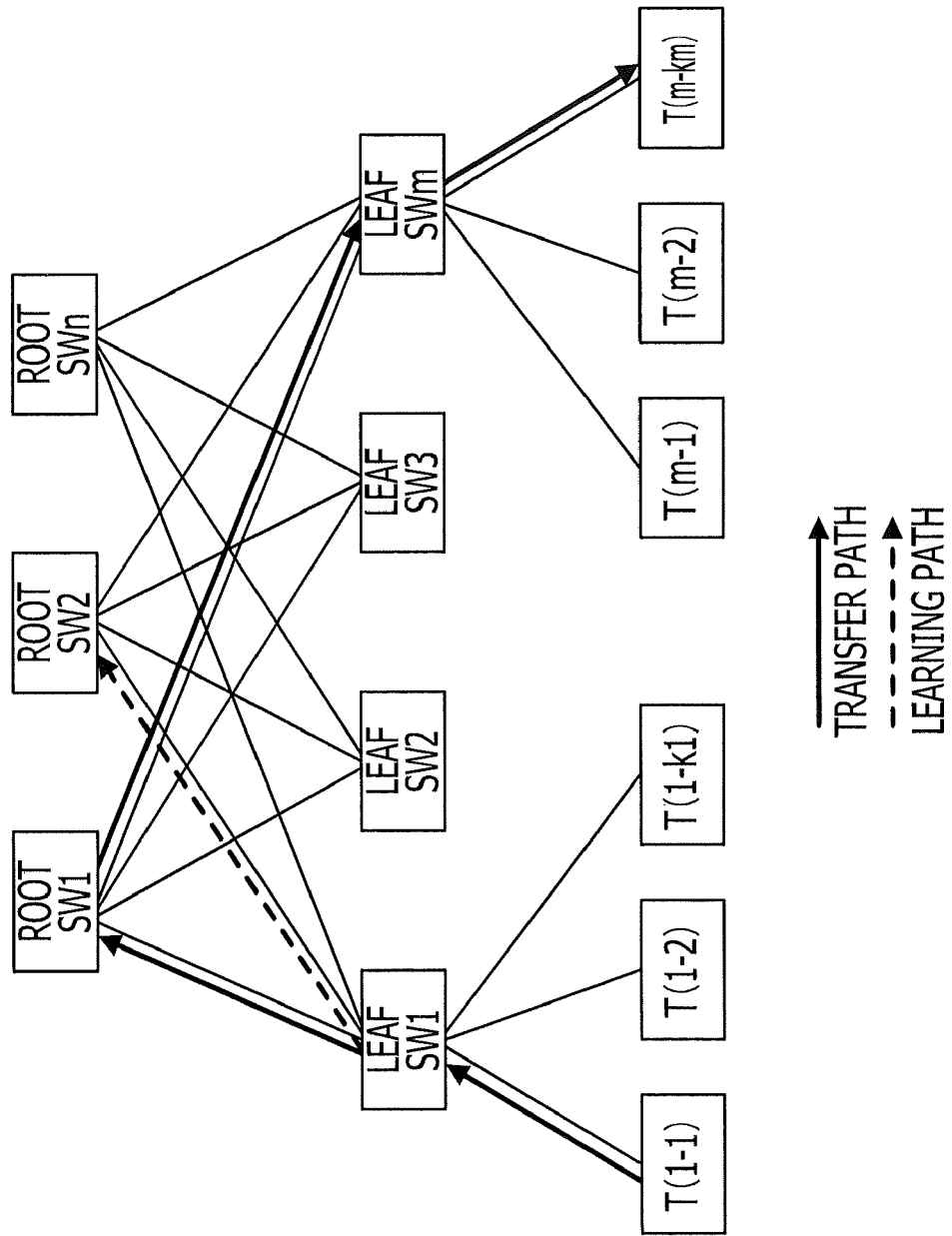
FIG. 2 illustrates a flow of packets in accordance with a first embodiment.

General operation of a switch (such as L2 switch) in a multistage configuration in an exemplary first embodiment is described below with reference to FIG. 2. A network topology of FIG. 2 is similar to FIG. 1. The leaf switches SW1-SWm hold the same mapping relationship in terms of a hash function, a hash value, and a root switch. For example, if a packet is transmitted from the terminal device T(1-1) to the terminal device T(m-km), the leaf switch SW1 having received the packet calculates a hash value of a destination address (for example, a MAC address of the terminal device T(m-km)) of the packet in an exemplary hash function, and identifies a root switch (the root switch SW1 here) of a packet transfer destination from the hash value. The leaf switch SW1 transfers the received packet to the root switch SW1. Without learning a transmission source address, the root switch SW1 identifies an output destination port by searching with a destination address an address table (also referred to as a learning table) storing a map of an address and a port number, and transmits the packet to the leaf switch SWm connected to the output destination port. However, if the transmission source address is not learned, the output destination port is not identified from the address table. In such a case, the packet may be broadcast. The leaf switch SWm receives the packet, identifies the output destination port by searching the address table with the destination address, and outputs the received packet to the terminal device T(m-km) connected to the output destination port.

In addition, the leaf switch SW1 performs an address learning process of a transmission source address (such as a MAC address of the terminal device T(1-1)). The leaf switch SW1 calculates a hash value of the transmission source address of the packet in an exemplary hash function, and identifies a root switch (the root switch SW2) that learns the transmission source address of the packet from the hash value. The leaf switch SW1 generates a learning packet from the received packet, and transmits the learning packet to the root switch SW2 as denoted by an arrow-headed broken line in FIG. 2. Upon receiving the learning packet, the root switch SW2 performs the address learning process of the transmission source address without transferring the packet.

Conversely, a packet may be transmitted from the terminal device T(m-km) to the terminal device T(1-1). The leaf switch SWm having received the packet calculates a hash value of a destination address (for example, a MAC address of the terminal device T(1-1)) of the packet in accordance with the hash function, and identifies a root switch (here the root switch SW2) as a packet transfer destination from the hash value. The leaf switch SWm transfers the received packet to the root switch SW2. The root switch SW2 have learned an address with the learning packet with the terminal device T(1-1) serving as a transmission source, and can thus identify which port the packet is to be output to. Without learning the transmission source address, the root switch SW2 searches the address table with the destination address to identify the output destination port, and transmits the packet to the leaf switch SW1 connected to the output destination port. The leaf switch SW1 identifies the output destination port by searching the address table with the destination address, and outputs the received packet to the terminal device T(1-1).

The leaf switch SWm calculates a hash value of the transmission source address (for example, the MAC address of the terminal device T(m-km)) of the packet in accordance with the hash function, and identifies from the hash value a root switch (the root switch SW1 in this case) that learns the transmission source address of the packet. The leaf switch SWm generates a learning packet from the received packet, and transmits the learning packet to the root switch SW1. Upon receiving the learning packet, the root switch SW1 performs the address learning process of the transmission source address without transferring the packet.

All the leaf switches SW1-SWm store the mapping relationship of the same hash function, and hash value to the root switch in this way. A packet addressed to a particular terminal device must be routed via one root switch. A learning packet used to learn the address of a particular terminal device is thus transmitted to such a root switch. With this arrangement, each of the n root switches simply learns k/n addresses if k terminal devices are present. The number of addresses to be learned is reduced.

The hash functions may be CRC32(x) % n (n being the number of root switches with modulo n of a value of CRC32 of a MAC address) using CRC32 known for cyclic redundancy checking (CRC) or (x<<L) % m based on L bit shifting (modulo n of a value of the L-bit shifted MAC address). Alternatively, another hash function outputting n values may be used.

Figure 3:
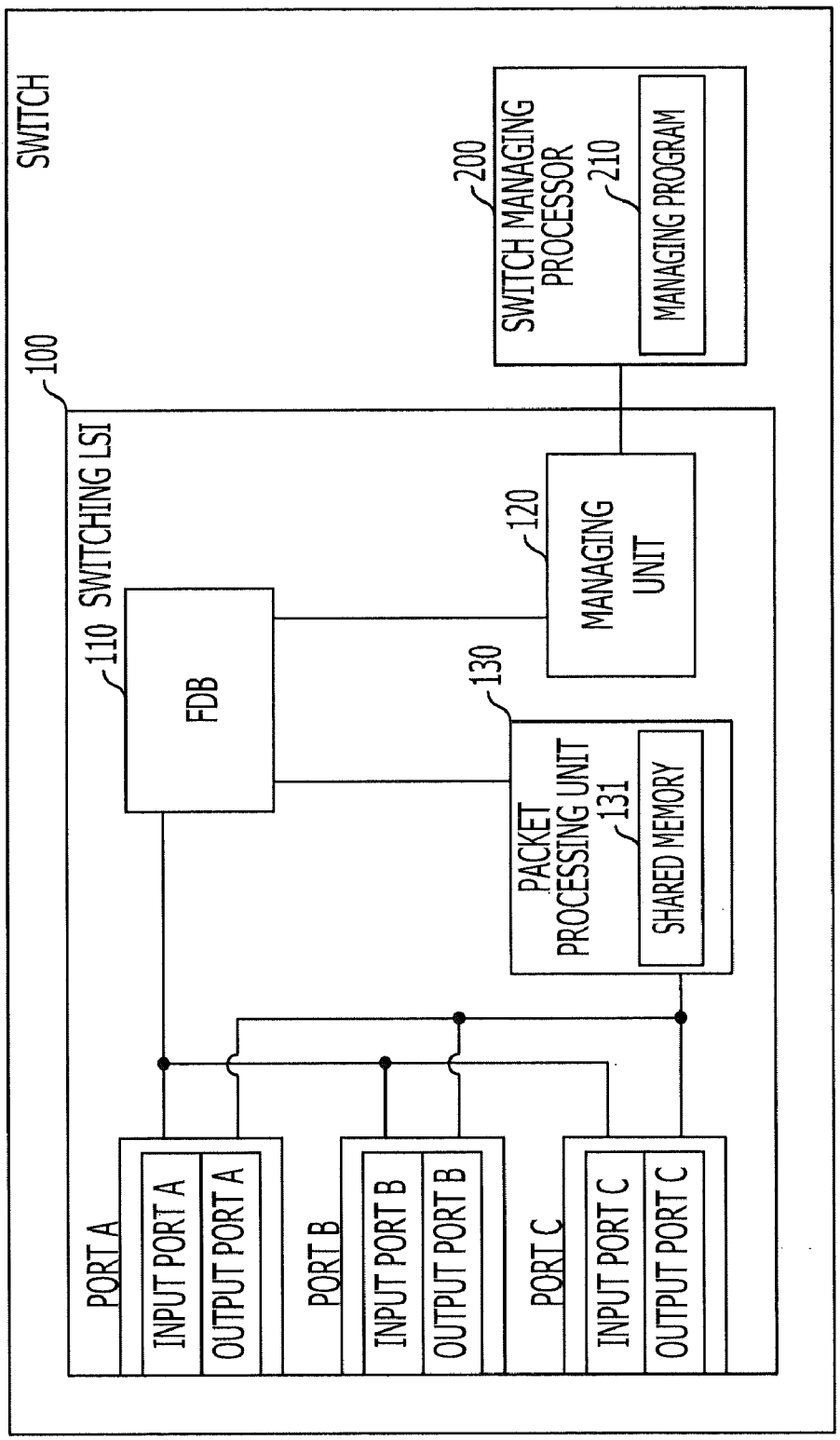
FIG. 3 illustrates an exemplary switch.

A structure of the switch included in the multistage network illustrated in FIG. 2 is described. FIG. 3 diagrammatically illustrates the structure of the switch. The leaf switch and the root switch are basically identical in structure to each other. The switches of the embodiment include a switching LSI 100, and a switch managing processor 200 connected to the switching LSI 100. The switch managing processor 200 executes a managing program 210 to perform an address learning process.

The switching LSI 100 includes a forwarding data base (FDB) 110, a managing unit 120 serving as an interface with the switch managing processor 200, a packet processing unit 130 connected to the FDB 110 and performing an input and output process of a packet, and a plurality of ports (ports A through C in FIG. 3) connected to each of the FDB 110 and the packet processing unit 130. The packet processing unit 130 includes a shared memory 131 shared by all the ports and a processor that performs a write and read process to the shared memory 131. Each of the ports A through C includes an input port and an output port. The number of ports is not limited to three. In the discussion that follows, however, the number of ports is three.

Figure 4:
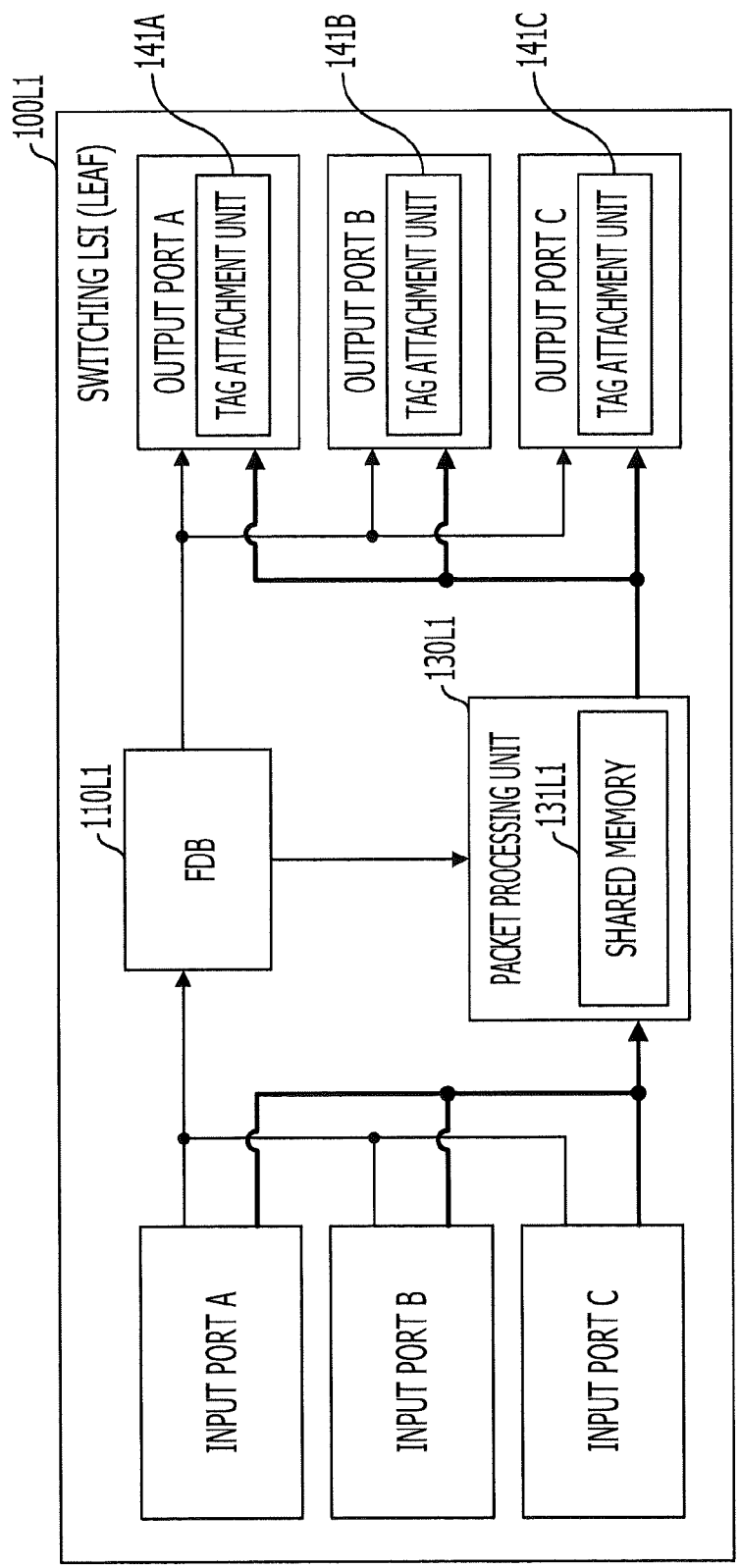
FIG. 4 illustrates an exemplary switching large-scale integrated circuit (LSI) of a leaf switch.

A structure of the switching LSI 100L1 as a leaf switch of the embodiment is described with reference to FIG. 4. The switching LSI 100L1 includes input ports A through C, output ports A through C, an FDB 110L1 connected to the input ports A through C, and the output ports A through C, and a packet processing unit 130L1 connected to the input ports A through C, and the output ports A through C. The FDB 110L1 may be connected to the packet processing unit 130L1. The packet processing unit 130L1 includes a shared memory 131L1. The output port A includes a tag attachment unit 141A, the output port B includes a tag attachment unit 141B, and the output port C includes a tag attachment unit 141C.

The input ports A through C output to the FDB 110L1 a transmission source address and a destination address of a packet if the packet is received from a downstream port connected to a terminal device. If a packet is received from an upstream port connected to a root switch, the input ports A through C output a destination address of the packet to the FDB 110L1. The input ports A through C output data of the received packet to the packet processing unit 130L1 to store the received packet data onto the shared memory 131L1.

Upon receiving the transmission source address and the destination address of the packet received from the downstream port connected to the terminal device, the FDB 110L1 performs an a known address learning process of the transmission source address. The FDB 110L1 calculates a hash values of the transmission source address and the destination address in an exemplary hash function. If the packet is received from the upstream port connected to the root switch, the FDB 110L1 searches the address table with the destination address of the packet to identify an output port.

As the address table, the FDB 110L1 may list a mapping relationship between a hash value and an identifier of a root switch in addition to a mapping relationship between a MAC address and an identifier (ID) of an output port. Alternatively, the FDB 110L1 may store data as listed in FIG. 5. Referring to FIG. 5, the address table stores a MAC address or a hash value with a port number mapped thereto. As illustrated in FIG. 5, hasha and hashb are hash values, denoting connected root switches. A pair of a hash value and a port number is set at startup. A port mapped to a hash value is a port to which an upper stage switch may be connected. A port having an MAC address registered therefor is a port to which a lower stage terminal device may be connected. It is also noted that any registered hash value is a hash value of the transmission source address or a hash value of the destination address. There are times when the hash value of the transmission source address and the hash value of the destination address can match.

The FDB 110L1 receives a packet from the terminal device T(1-1) addressed to the terminal device T(1-2) in FIG. 2, for example. In such a case, it is not necessary to transfer the packet to a root switch. As with the packet from a root packet, the FDB 110L1 searches the address table with the destination address to identify the port number.

If the packet is received from the downstream port connected to the terminal device, the FDB 110L1 identifies a port number corresponding to the hash value of the destination address and a port number corresponding to the hash value of the transmission source address. The FDB 110L1 then notifies the packet processing unit 130L1 of the port numbers and causes the packet processing unit 130L1 to output the data of the received packet to an output port having a first port number (the output port C, for example). The FDB 110L1 causes the packet processing unit 130L1 to output the data of the learning packet identical to the received packet to an output having a second port number (the output port B, for example). The packet processing unit 130L1 may reconstruct the received packet. In the embodiment, however, the learning packet identical to the received packet is output as is.

The FDB 110L1 notifies the output port having the port number corresponding to the hash value of the destination address that the packet is a transfer packet and notifies the output port having the port number corresponding to the hash value of the transmission source address that the packet is a learning packet.

Figure 6:
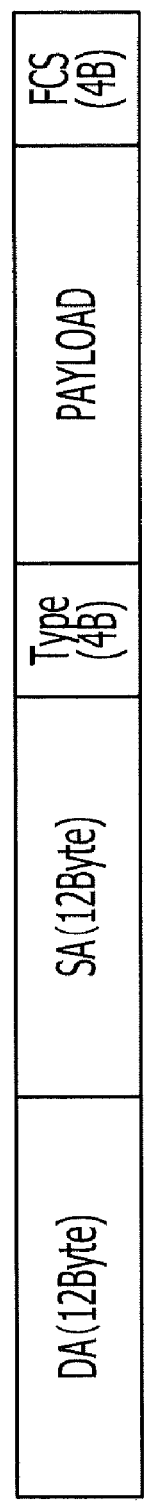
FIG. 6 illustrates a packet format of a standard packet.

Since the output port C is notified by the FDB 110L1 that the packet is the transfer packet, the output port C outputs the data received from the packet processing unit 130L1 as the transfer packet as in a standard output procedure. The tag attachment unit 141C is not activated. In other words, the packet includes a destination address (DA) of 12 bytes, a source address (SA) of 12 bytes, a type of 4 bytes, a payload (variable length), and a frame check sequence (FCS) of 4 bytes, as illustrated in FIG. 6.

Since the output port B is notified by the FDB 110L1 that the packet is the learning packet, the tag attachment unit 141B reconstructs the data of the packet received from the packet processing unit 130L1 as a learning packet. More specifically, as illustrated in FIG. 7, the tag attachment unit 141B attaches a tag (4 bytes) indicating a learning packet to the data included in the transfer packet in succession to the transmission source address SA. In this way, the root switch can easily learn that the received packet is a learning packet.

Upon receiving a packet from an upstream port connected to a root switch, the FDB 110L1 notifies the packet processing unit 130L1 of a port number that is identified by searching the address table with the destination address of the received packet. The packet processing unit 130L1 outputs the data of the received packet to the output port having the notified port number. The FDB 110L1 notifies the output port having the notified port number that the received packet is the transfer packet. The subsequent process remains unchanged from the process discussed with reference to the output C.

Figure 8:
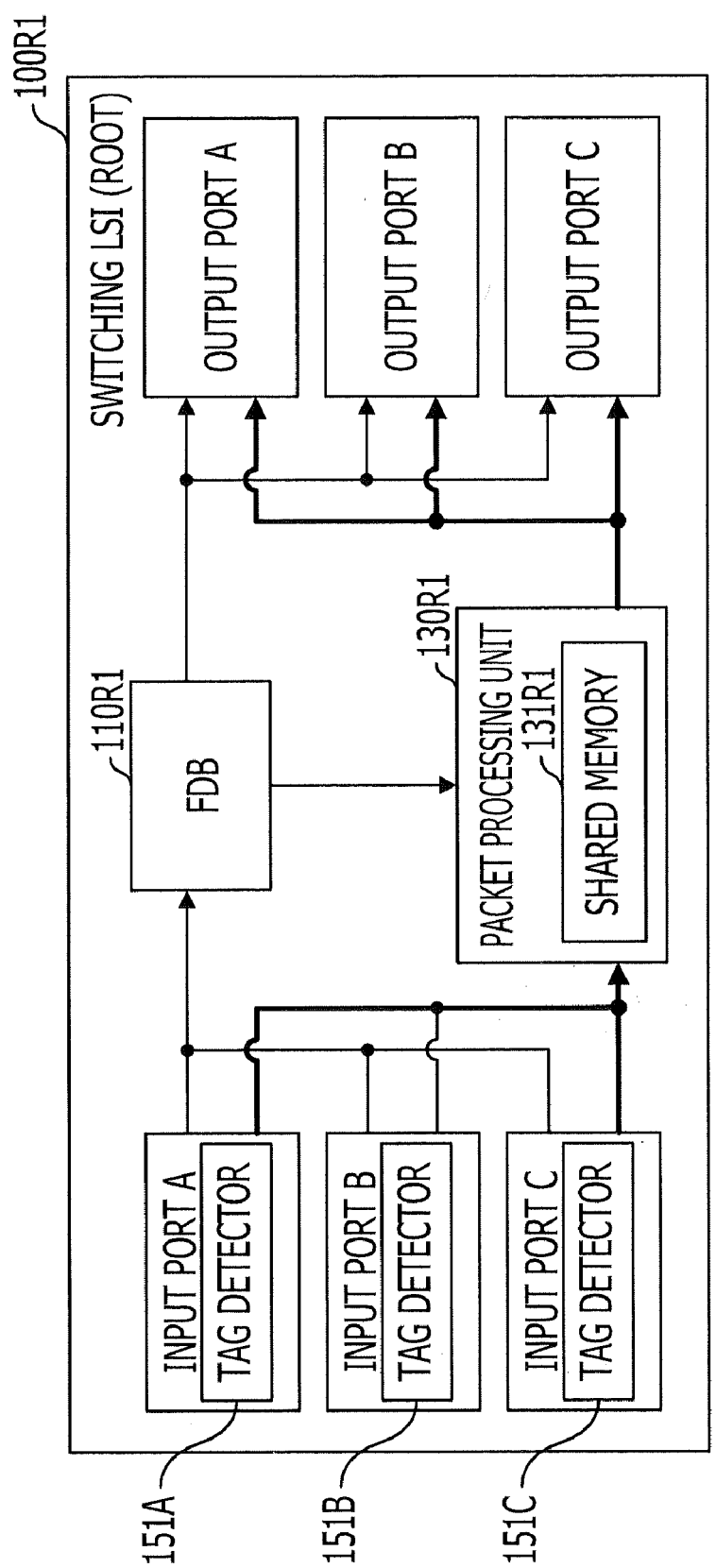
FIG. 8 illustrates a switching LSI in a root switch in accordance with the first embodiment.

FIG. 8 illustrates a structure of a switching LSI 100R1 as a root switch of the embodiment. The switching LSI 100R1 includes input ports A through C, output ports A through C, an FDB 110R1 connected to the input ports A through C and the output ports A through C, and a packet processing unit 130R1 connected to the input ports A through C, and the output ports A through C. The FDB 110R1 may be connected to the packet processing unit 130R1. The input port A includes a tag detector 151A, the input port B includes a tag detector 151B, and the input port C includes a tag detector 151C.

The tag detectors 151A through 151C of the input ports A through C examine the packets received from the leaf switches SW1-SWm to determine whether the tag illustrated in FIG. 7 is included in the data of the packet. If the tag is included in the data of the packet, the packet is a learning packet, and the tag detectors 151A through 151C output the data indicating the learning packet and the transmission source address to the FDB 110R1. If the tag is not included in the data of the packet, the packet is a transfer packet, and the tag detectors 151A through 151C output the data indicating the transfer packet and the destination address to the FDB 110R1. Upon receiving the transfer packet, the input ports A through C output the data of the packet to the packet processing unit 130R1 to cause the data of the packet to be stored on the shared memory 131R1. If the learning packet is received, the input ports A through C may discard the received learning packet. Alternatively, the received packet regardless of the transfer packet or the learning packet may be output to the packet processing unit 130R1, and the packet processing unit 130R1 may be notified by one of the input port and the FDB 110R1 that the packet is the learning packet. The packet processing unit 130R1 may then discard the data of the learning packet.

Upon receiving the transmission source address of the learning packet, the FDB 110R1 performs a known address learning process on the transmission source address. Simply stated, the transmission source address is registered with a port number of an input port having output the transmission source address mapped thereto on the address table.

Upon receiving the destination address of the transfer packet, the FDB 110R1 identifies the port number of the output port by searching the address table with the destination address. The FDB 110R1 outputs the port number to the packet processing unit 130R1.

FIG. 9 illustrates an example of the address table stored by the FDB 110R1. Referring to FIG. 9, the MAC address and the output port number are registered in a mapped state thereof. No hash value is registered in the root switches SW1 through SWn. As previously discussed, if n root switches are employed with k terminal devices connected, k/n MAC addresses are registered on the address table in one root switch.

Upon receiving the port number from the FDB 110R1, the packet processing unit 130R1 outputs the data of corresponding transfer packet to the output port identified by the port number. In this case, the FDB 110R1 also instructs the output port having the identified port number to transfer the data of the packet.

The learning packet may be discarded by the input port or the packet processing unit 130R1. Alternatively, the learning packet may be discarded by the output port. In other words, the input port and the packet processing unit 130R1 perform the processes thereof without any difference applied between the transfer packet and the learning packet, and the FDB 110R1 outputs to the output port of the identified port number the data representing that the packet is the learning packet. The output port having received the data representing the learning packet discards the data of the packet received from the packet processing unit 130R1.

The output port having the port number identified by the FDB 110R1 outputs the data received from the packet processing unit 130R1 as the transfer packet in the standard output procedure.

Through the above-described process, the transmission source address is learned in a known procedure in the case of the learning packet. In the case of the transfer packet, the address table is searched with the destination address to identify the output port, and the packet is output through the output port.

A process of the terminal device that transmits a packet through the network of FIG. 2 is described below with reference to FIG. 10. As described above, the packet is transmitted from the terminal device T(1-1) to the terminal device T(m-km) in FIG. 2. The input port of the leaf switch SW1 receives the packet from the terminal device T(1-1) (S1). The input port outputs the transmission source address and the destination address to the FDB 110L1. The FDB 110L1 calculates a hash value Hash(DA) of the transmission source address and a hash value Hash(SA) of the destination address. The FDB 110L1 further identifies a port number corresponding to the hash value Hash(DA) and notifies the packet processing unit 130L1 of the port number. The FDB 110L1 notifies the output port A having the port number that the packet is the transfer packet. The packet processing unit 130L1 receives the data of the packet from the input port, stores the data of the packet on the shared memory 131L1, and outputs the data of the packet to the output port A having the port number of which the FDB 110L1 has notified the packet processing unit 130L1. The output port A outputs the packet (S3).

The input port A of the root switch SW1 may be connected to the output port A of the leaf switch SW1 identified in S3, and receives the transfer packet (S5). The input port A of the root switch SW1 identifies the received packet to be the transfer packet, and outputs the destination address of the transfer packet to the FDB 110R1. The FDB 110R1 searches the address table with the destination address to identify the port number, and then notifies the packet processing unit 130R1 of the identified port number. The input port A outputs the received packet to the packet processing unit 130R1. The packet processing unit 130R1 stores the packet on the shared memory 131R1. Upon receiving the port number from the FDB 110R1, the packet processing unit 130R1 outputs the data of the packet to the output port B having the output port number, for example. The output port B outputs the data of the packet received from the packet processing unit 130R1 (S7).

The input port A as an upstream port of the leaf switch SWm may be connected to the output port B of the root switch SW1 identified in S7, and receives the transfer packet (S9). The input port A of the leaf switch SW1 outputs the destination address of the transfer packet to the FDB 110L1, and outputs the data of the packet to the packet processing unit 130L1 to cause the data of the packet to be stored on the shared memory 131L1. The FDB 110L1 identifies the port number by searching the address table with the destination address, and notifies the packet processing unit 130L1 of the identified port number. The FDB 110L1 instructs the output port of the identified port number to output the transfer packet. The packet processing unit 130L1 outputs the data of the packet to the output port C of the notified port number, for example. The output port C outputs the data of the packet received from the packet processing unit 130L1 to the terminal device T(m-km) (S11).

The FDB 110L1 of the leaf switch SW1 performs a learning process on the transmission source address SA of the received packet (S13). The FDB 110L1 identifies the port number corresponding to the hash value Hash(SA) calculated for the transmission source address and notifies the packet processing unit 130L1 of identified the port number. The FDB 110L1 also notifies the output port B of the port number that the packet is the learning packet. The packet processing unit 130L1 outputs the data of the received packet stored on the shared memory 131L1 to the output port B of the port number of which the FDB 110L1 has notified the packet processing unit 130L1. The output port B outputs the data of the received packet as the learning packet (S15). In accordance with the embodiment, the tag attachment unit 141B of the output port B attaches to the data of the received packet the tag indicating the learning packet, and then outputs the tag attached data of the packet.

The input port A of the root switch SW2 may be connected to the output port B of the leaf switch SW1. Upon receiving the packet, the input port A determines that the packet is the learning packet (S17). The input port A outputs the transmission source address of the learning packet to the FDB 110R1. The FDB 110R1 performs the address learning process on the received transmission source address (S19), but does not transfer the packet.

Through the above-described process, the number of transmission source addresses that are to be learned by one root switch is reduced.

In an exemplary first embodiment, the tag attachment unit in each of the leaf switches SW1-SWm attaches the tag to the packet, thereby generating the learning packet different from the transfer packet. However, it is not necessary to generate a distinctly different learning packet in each of the leaf switches SW1-SWm.

In an exemplary second embodiment, the leaf switches SW1-SWm transmit, as a learning packet, a packet identical to a transfer packet to a root switch, and the root switch then determines whether the packet is a learning packet or a transfer packet.

Figure 11:
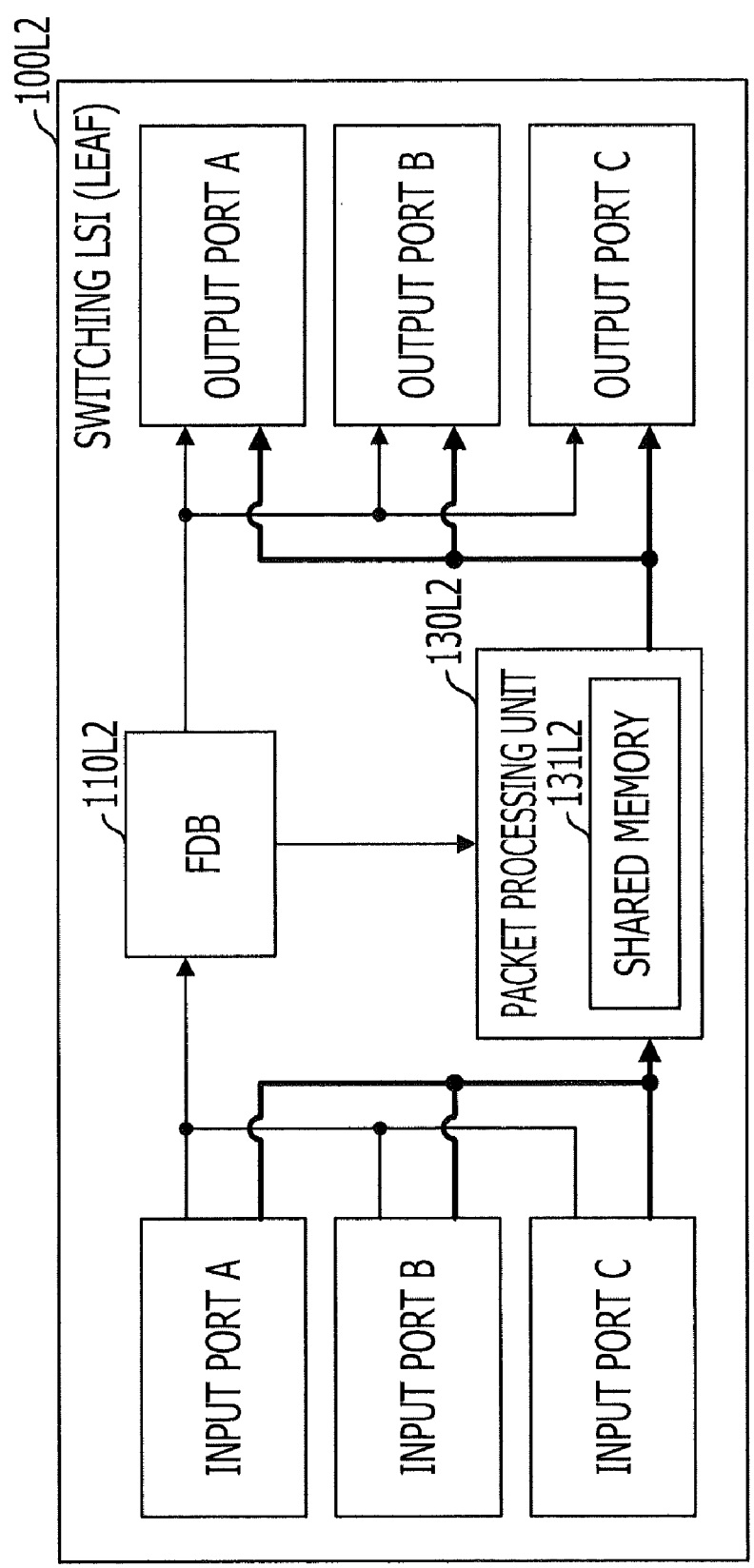
FIG. 11 illustrates a switching LSI in a leaf switch in accordance with a second embodiment.

The leaf switches SW1-SWm of the second embodiment has a structure illustrated in FIG. 11. A switching LSI 100L2 of FIG. 11 includes input ports A through C, output ports A through C, an FDB 110L2 connected to the input ports A through C, and the output ports A through C, and a packet processing unit 130L2 connected to the input ports A through C, and the output ports A through C. The FDB 110L2 may be connected to the packet processing unit 130L2. The packet processing unit 130L2 includes a shared memory 131L2.

The output ports A through C include no tag attachment units. Even if the input ports A through C, the FDB 110L2, and the packet processing unit 130L2 perform the same processes as the processes in the first embodiment, the output ports A through C output as the learning packet the packet identical to the transfer packet. If the root switch of the learning packet matches the root switch as a transfer destination of the transfer packet, only one packet may be transmitted rather transmitting the two packets.

If the packet identical to the transfer packet is used as a learning packet, the root switches SW1 through SWn may perform a particular process to determine whether the packet is a transfer packet or a learning packet.

Figure 12:
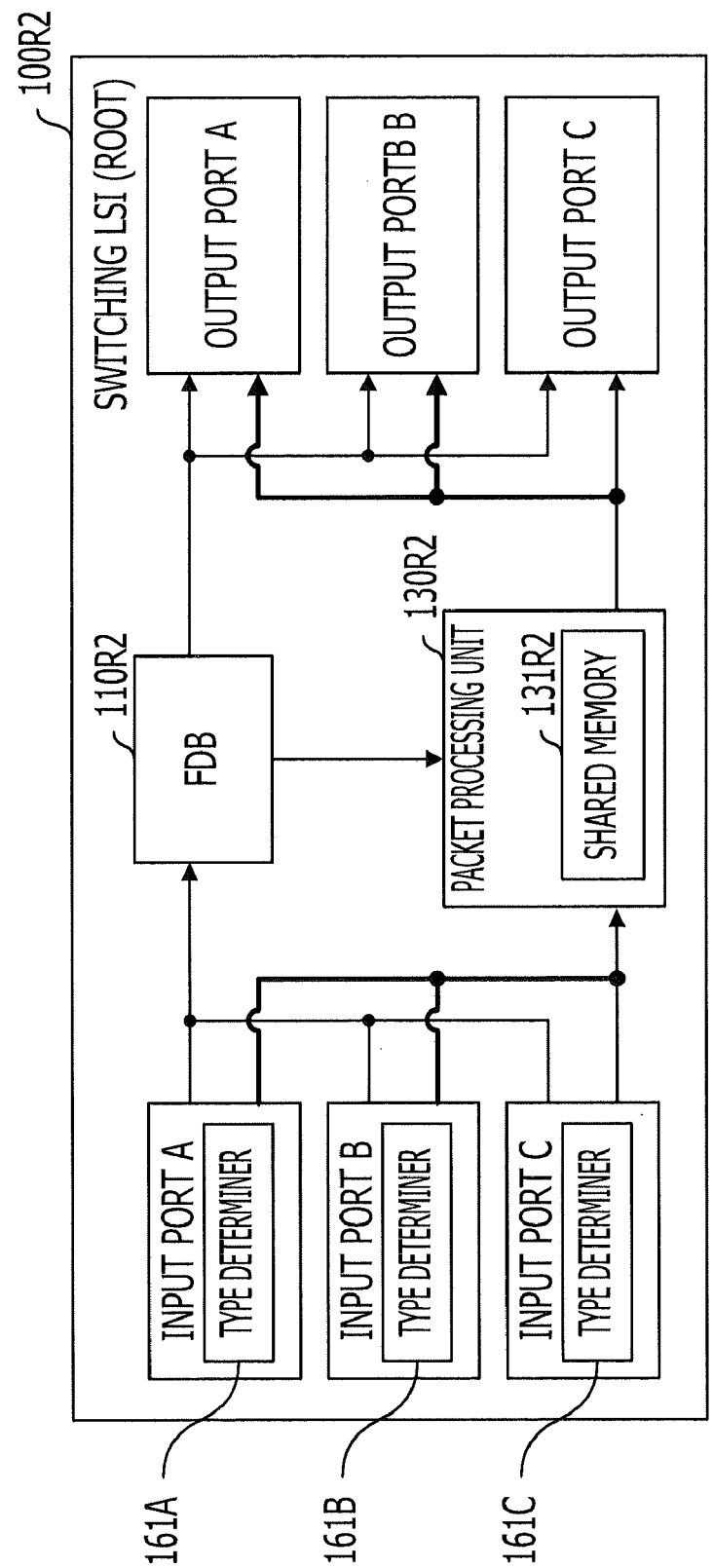
FIG. 12 illustrates switching LSI in a root switch in accordance with a second embodiment.

In an exemplary second embodiment, a root switch having the structure illustrated in FIG. 12 is used. A switching LSI 100R2 includes input ports A through C, output ports A through C, an FDB 110R2 connected the input ports A through C, and the output ports A through C, and a packet processing unit 130R2 connected to the input ports A through C, and the output ports A through C. The FDB 110R2 may be connected to the packet processing unit 130R2. The packet processing unit 130R2 includes a shared memory 131R2. The input port A includes a type determiner 161A, the input port B includes a type determiner 161B, and the input port C includes a type determiner 161C.

By comparison with the first embodiment, a type determiner 161 may be used in place of the tag detector 151. The type determiner 161 holds a hash function to be used in a leaf switch (more precisely, a one-stage lower switch). In accordance with the hash function, the type determiner 161 calculates the hash value of the transmission source address, and the hash value of the destination address. If the hash value of the transmission source address matches an identifier (more specifically, number) of own switch, the type determiner 161 determines that the packet is a learning packet. On the other hand, if the hash value of the destination address matches the identifier of own switch, the type determiner 161 determines that the packet is a transfer packet. The hash value of the transmission source address and the hash value of the destination address may match the identifier of own switch. In such a case, the type determiner 161 determines that the packet is a transfer packet and a learning packet.

If the determination process is performed as described above, the FDB 110R2, the packet processing unit 130R2, and the output ports A through C operate basically in the same way as in the first embodiment.

The number of addresses to be learned on the root switches SW1 through SWn is thus reduced.

If the hash value of the transmission source address of the received packet matches the identifier of own switch, and if the hash value of the destination address matches the identifier of own switch, a process may be performed based on the premise that the input port have received the two packets, i.e., the learning packet and the transfer packet. No problem arises even if the FDB 110R2, the packet processing unit 130R2, and the output ports A through C perform the same processes as the processes previously described.

In accordance with the first embodiment, the tag is attached to a packet if the packet is a learning packet. In accordance with the second embodiment, the leaf switch performs no process. An amount of data flowing through a multistage switch network increases by a learning packet. The amount of data of the learning packet may be reduced.

Figure 13:
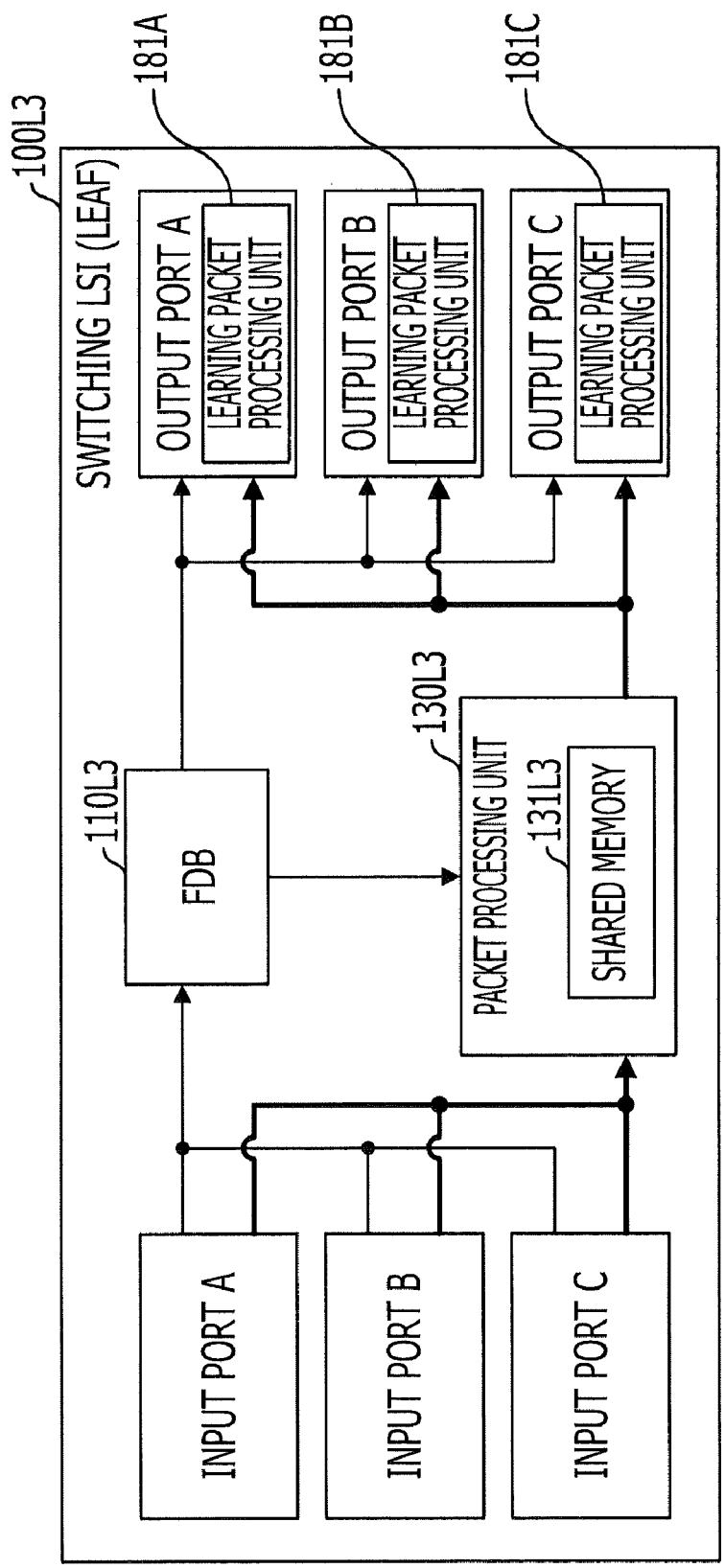
FIG. 13 illustrates switching LSI in a leaf switch in exemplary third through sixth embodiments.

In an exemplary third embodiment, an amount of payload unnecessary for the learning packet is eliminated. FIG. 13 illustrates a structure of each of the leaf switches SW1-SWm in accordance with the third embodiment. A switching LSI 100L3 of FIG. 3 includes input ports A through C, output ports A through C, an FDB 110L3 connected to the input ports A through C, and the output ports A through C, and a packet processing unit 130L3 connected to the input ports A through C, and the output ports A through C. The FDB 110L3 may be connected to the packet processing unit 130L3. The packet processing unit 130L3 includes a shared memory 131L3.

The output port B includes a learning packet processing unit 181A, the output port B includes a learning packet processing unit 181B, and the output port C includes a learning packet processing unit 181C. Upon receiving the data identifying the learning packet from the FDB 110L3, the learning packet processing unit 181 reduces an amount of data of payload of the packet down to a minimum size of one packet (64 bytes here). As illustrated in FIG. 6, the packet ends with the FCS of 4 bytes. An end portion of the payload is discarded so that the packet length from the head of the packet to the end of the payload becomes 60 bytes. If the data of payload is partially discarded in this way, the FCS needs to be re-calculated. The packet processing unit 130L3 may partially discard the payload.

This arrangement reduces an amount of data of the learning packet flowing through the multistage switch network. The third embodiment is applicable to any of the first and second embodiments.

The property of the address learning makes it unnecessary for all the learning packets to be exchanged between the leaf switch and the root switch. In the case of congestion, however, the transfer packet needs to have a higher priority.

In an exemplary fourth embodiment, the output ports A through C of each of the leaf switches SW1-SWm lower the learning packet in priority than the transfer packet. If the output ports A through C receive a learning packet in FIG. 13, the learning packet processing units 181A through 181C set a lower priority for the learning packet. Output control of a packet in accordance with the priority remains unchanged from related art, and no further detail is provided about the output control. If a bandwidth of a link to an upper stage switch from the leaf switches SW1-SWm is restricted by a predetermined level or higher by the learning packet, the output of the learning packet is suspended or the learning packet is deleted. The output of the transfer packet is set to have a higher priority. This arrangement prevents standard communications between terminal devices from being adversely affected.

A packet may remain in an input port on a root switch side in the case of a congestion. The priority of the learning packet is set to be lower in the input ports of each of the root switches SW1 through SWn. The transfer packet is thus processed with a higher priority.

A fourth exemplary embodiment is applicable to the first through third embodiments.

In accordance with a fourth exemplary embodiment, the packets are prioritized. A bandwidth for one of the transfer packet and the learning packet may be set for a link between the leaf switch and the root switch. Referring to FIG. 13, the learning packet processing units 181A through 181B of the output ports A through C of each of the leaf switches SW1-SWm receive and set an input of a maximum bandwidth for the learning packet in response to an instruction from an administrator, for example. The bandwidth for the transfer packet is thus reserved, and the transfer packet is transferred with a higher priority.

A fifth exemplary embodiment is applicable to each of the first through third embodiments.

Each of the output ports A through C of the leaf switches SW1-SWm includes a buffer. Data of a plurality of packets may be stored on the buffer. In the case of a transfer packet, all the transfer packets are to be output. In the case of a learning packet, it is not necessary to output all the learning packets in view of the property of the learning packet. Important data of the learning packet is a transmission source address, and learning packets having the same transmission source address are handled as the same learning packet even if the learning packets have different destination addresses.

The learning packet processing unit 181A through 181C of the output ports A through C in each the leaf switches SW1-SWm in FIG. 13 may receive from the packet processing unit 130L3 a plurality of learning packets having the same transmission source address and then hold the plurality of learning packets. In such a case, each of the learning packet processing unit 181A through 181C selects one learning packet while the remaining learning packets. This arrangement controls the bandwidth of the learning packet without affecting the address learning. It is effective if at least one of the learning packets having the same transmission source address is discarded.

A sixth exemplary embodiment is applicable to the first through fifth embodiments.

Figure 14:
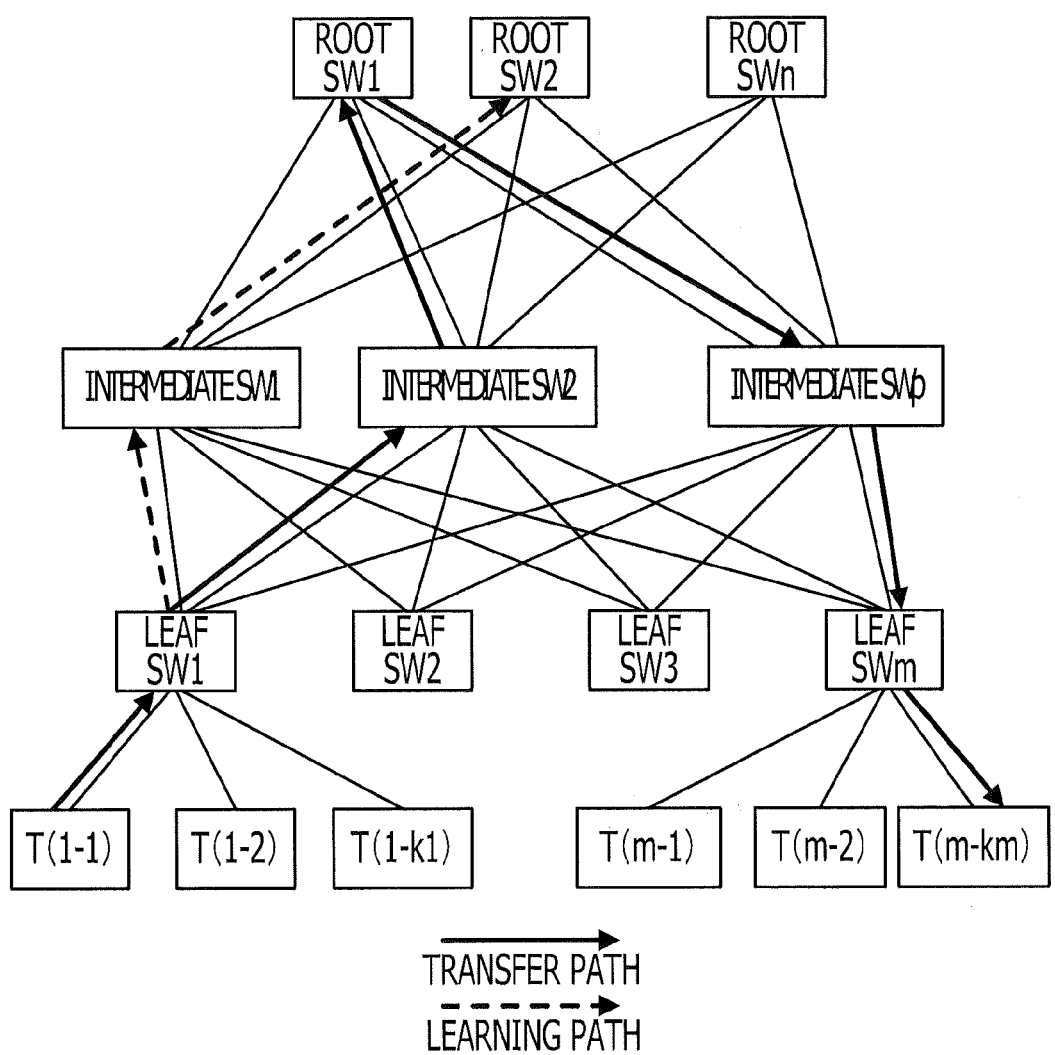
FIG. 14 illustrates a flow of a packet in a seventh exemplary embodiment.

The multistage switch network of the first through sixth embodiments is a two-stage switch network. Three-stage or more-stage switch network may also be implemented. FIG. 14 illustrates a three-stage switch network. Referring to FIG. 14, leaf switches SW1-SWm are arranged as switches at the bottommost stage, intermediate stage switches SW1 through SWp are arranged as switches at the intermediate stage, and root switches SW1 through SWn are arranged as switches at the topmost stage. Terminal devices T(1-1) through T(1-k1) are connected downstream of the leaf switch SW1. Similarly, terminals devices are connected to each of the leaf switches. Each of the leaf switches SW1-SWm may be connected to each of the intermediate stage switches SW1 through SWp. Each of the intermediate stage switches SW1 through SWp may be connected to each of the root switches SW1 through SWn.

In such a network topology, the leaf switches SW1-SWm and the root switches SW1 through SWn can be identical to the counterparts discussed with reference to the first through sixth embodiments. In response to a learning packet from a lower stage switch, each of the intermediate stage switches SW1 through SWp calculates a hash value Hash(SA) of the transmission source address in an exemplary common hash function $Hash_{mid}$, and transfers the learning packet to an upper stage switch corresponding to the hash value. No process for generating a learning packet is performed. In response to a transfer packet from a lower stage switch, each of the intermediate stage switches SW1 through SWp calculates the hash value $Hash_{mid}(DA)$ of the destination address, and transfers the transfer packet to an upper stage switch corresponding to the hash value. In response to a transfer packet from an upper stage switch, each of the intermediate stage switches SW1 through SWp searches the address table with the destination address to identify an output destination port, and then outputs the transfer packet to the output destination port.

FIG. 14 illustrates a transmission process of a packet transmitted from the terminal device T(1-1) to the terminal device T(m-km). Upon receiving the packet from the terminal device T(1-1), the leaf switch SW1 calculates the hash value $Hash_L$(DA) of the destination address, identifies an intermediate switch SW2 corresponding to the hash value $Hash_L$(DA), and then transfers the transfer packet to the intermediate switch SW2. Upon receiving the transfer packet, the intermediate switch SW2 calculates the hash value $Hash_{mid}$(DA) of the destination address of the transfer packet, identifies a root switch SW1 corresponding to the hash value $Hash_{mid}$(DA), and transfers the transfer packet to the root switch SW1. Upon receiving the transfer packet, the root switch SW1 searches the address table with the destination address of the transfer packet to identify an output destination port, and outputs the transfer packet to the intermediate switch SWp from the output destination port. Upon receiving the transfer packet, the intermediate switch SWp searches the address table with the destination address of the transfer packet to identify an output destination port, and outputs the transfer packet to the output destination port. The identified output destination port of the intermediate switch SWp may be connected to the leaf switch SWm. Upon receiving the transfer packet, the leaf switch SWm searches the address table with the destination address of the transfer packet to identify an output destination port, and outputs the transfer packet from the output destination port. The identified output destination port of the leaf switch SWm may be connected to the terminal device T(m-km). The transfer packet thus reaches the destination address.

Figure 15:
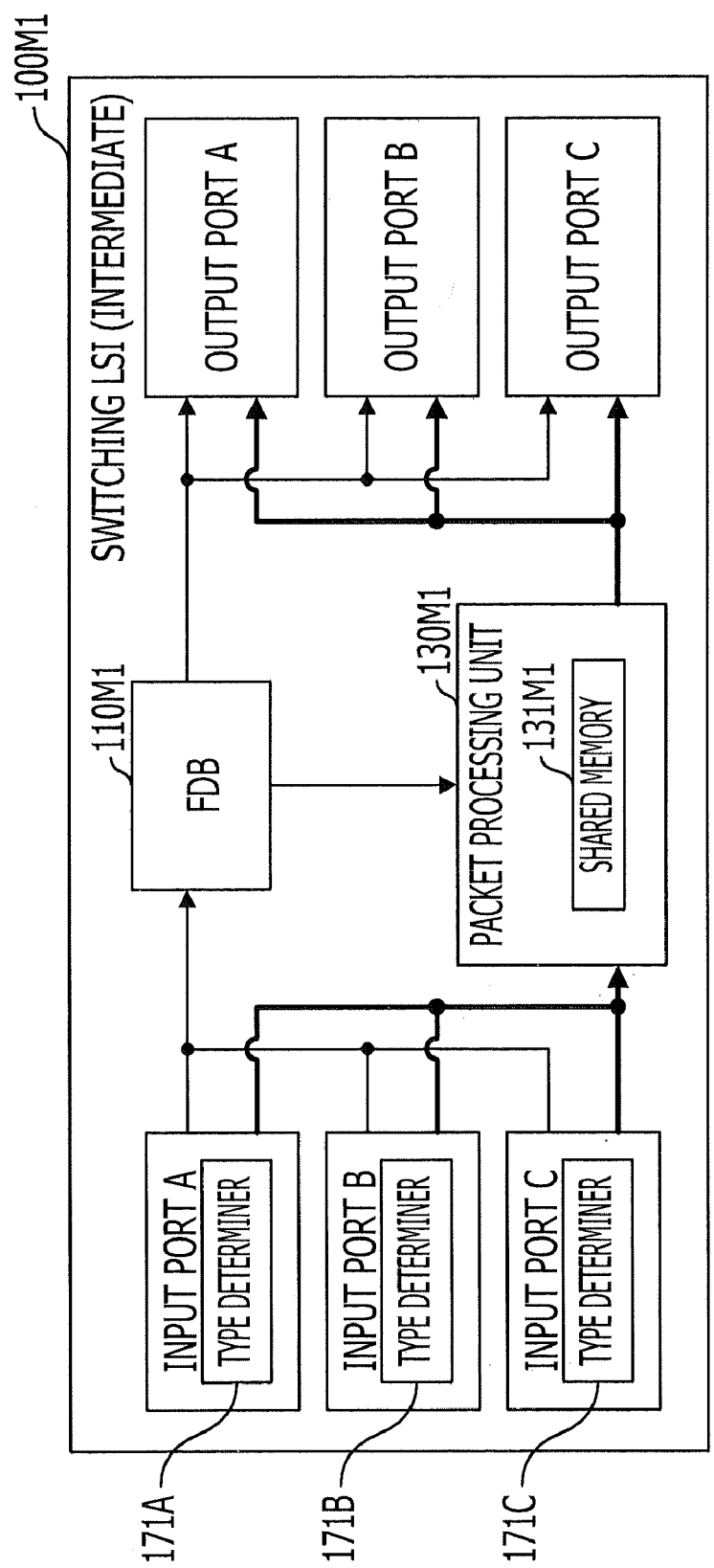
FIG. 15 illustrates switching LSI in an intermediate switch in accordance with the seventh embodiment.

FIG. 15 illustrates a structure of a switching LSI 100M1 of each of the intermediate stage switches SW1 through SWp of a seventh embodiment. The switching LSI 100M1 includes input ports A through C, output ports A through C, an FDB 110M1 connected to the input ports A through C, and the output ports A through C, and a packet processing unit 130M1 connected to the input ports A through C, and the output ports A through C. The FDB 110M1 may be connected to the packet processing unit 130M1. The packet processing unit 130M1 includes a shared memory 131M1. The input port A includes a type determiner 171A, the input port B includes a type determiner 171B, and the input port C includes a type determiner 171C.

The type determiner 171A through 171C of the input ports A through C determine whether a packet received from each of the leaf switches SW1-SWm is a learning packet or a transfer packet. In the case of the learning packet illustrated in FIG. 6, the type determiner 171A through 171C calculate the hash value of the destination address and the hash value of the transmission source address in accordance with the hash value used in a lower stage switch and then determines which of the hash values matches the identifier of own switch as described with reference to the second embodiment. In the case of the learning packet as illustrated in FIG. 7, the type determiner 171A through 171C determine whether the tag indicating the learning packet is included as described with reference to the first embodiment.

In response to the learning packet, the data indicating the learning packet and the transmission source address are output to the FDB 110M1. In response to the transfer packet, the data indicating the transfer packet and the destination address are output to the FDB 110M1. The input ports A through C output the data of the transfer packet or the learning packet to the packet processing unit 130M1 to store the data on the shared memory 131M1. Unlike the root switches SW1 through SWn, the intermediate stage switches SW1 through SWp are free from discarding the learning packet, and unlike the leaf switches SW1-SWm, the intermediate stage switches SW1 through SWp are free from generating a new learning packet.

Upon receiving the transmission source address of the learning packet, the FDB 110M1 performs the known address learning process on the transmission source address. Simply stated, the transmission source address is registered with a port number of an input port having output the transmission source address mapped thereto on the address table.

Upon receiving the destination address of the transfer packet from a lower stage switch, the FDB 110M1 calculates a hash value $\text{Hash}_{mid}(\text{DA})$, and searches the address table with the hash value $\text{Hash}_{mid}(\text{DA})$ to identify a port number of an output port. The FDB 110M1 then outputs the port number to the packet processing unit 130M1.

Upon receiving the transmission source address of the learning packet, the FDB 110M1 calculates a hash value $\text{Hash}_{mid}(\text{SA})$, and searches the address table with hash value $\text{Hash}_{mid}(\text{SA})$ to identify a port number of an output port. The FDB 110M1 then outputs the port number to the packet processing unit 130M1.

The address table of the FDB 110M1 is illustrated in FIG. 5. One of the MAC address and the hash value is mapped to the output port number. A mapping of the hash value and an ID of the root switch may be separately stored. If p root switches are present with k terminal devices connected, k/p MAC addresses for each root switch and n hash values for the root switches SW1 through SWn are registered on the address table.

If a transfer packet is received from an upper stage switch, the FDB 110M1 receives the destination address of the transfer packet. The FDB 110M1 searches the address table with the destination address, identifies the corresponding output port number, and notifies the packet processing unit 130M1 of the output port number.

Upon receiving the port number from the FDB 110M1, the packet processing unit 130M1 outputs the data of the corresponding transfer packet or the corresponding learning packet to the output port identified by the port number. Also, the FDB 110M1 instructs the output port of the identified port number to transfer the packet.

The output port having the port number identified by the FDB 110M1 outputs the data received from the packet processing unit 130M1 in the standard output procedure as one of the learning packet and the transfer packet.

Through the above-described process, the learning packet is learned for the transmission source address, and the learning packet is transferred to an upper stage switch based on the hash value of the transmission source address. The transfer packet is transferred to an upper stage switch based on the hash value of the destination address.

A process of a terminal device that transmits a packet over the network of FIG. 14 is described below with reference to FIG. 16. The packet is transmitted from the terminal device T(1-1) to the terminal device T(m-km) as illustrated in FIG. 14. An input port of the leaf switch SW1 as a downstream port connected to the terminal device T(1-1) receives a packet (S31). The input port outputs the transmission source address and the destination address to the FDB 110L1. The FDB 110L1 calculates a hash value $\text{Hash}_L(\text{SA})$ of the transmission source address and a hash value $\text{Hash}_L(\text{DA})$ of the destination address. The FDB 110L1 identifies a port number corresponding to the hash value $\text{Hash}_L(\text{DA})$ and notifies the packet processing unit 130L1 of the identified port number. The FDB 110L1 also notifies the output port A having the port number that the packet is a transfer packet. Upon receiving the data of the packet from the input port, the packet processing unit 130L1 stores the data of the packet on the shared memory 131 L1, and outputs the data of the packet to the output port A having the port number of which the FDB 110L1 has notified the packet processing unit 130L1. The output port A outputs the packet (S33).

The input port A of the intermediate switch SW2 may be connected to the output port A of the leaf switch SW1 identified in S33, and receives a transfer packet (S35). The input port A of the intermediate switch SW2 determines that the received packet is a transfer packet, and outputs the destination address of the transfer packet to the FDB 110M1. The FDB 110M1 calculates the hash value $\text{Hash}_{mid}(\text{DA})$ of the destination address, identifies a port number corresponding to the hash value $\text{Hash}_{mid}(\text{DA})$, and notifies the packet processing unit 130M1 of the identified port number. The input port A outputs the received packet to the packet processing unit 130M1. The packet processing unit 130M1 stores the received packet on the shared memory 131M1. Upon receiving the port number from the FDB 110M1, the packet processing unit 130M1 outputs the data of the packet to the output port B having the output port number. The output port B then outputs the data of the packet received from the packet processing unit 130M1 (S37).

The input port C of the root switch SW1 may be connected to the output port B of the intermediate switch SW2 identified in S37, and receives a transfer packet (S39). The input port C of the root switch SW1 determines that the received packet is the transfer packet, and outputs the destination address of the transfer packet to the FDB 110R1. The FDB 110R1 searches the address table with the destination address to identify the port number, and notifies the packet processing unit 130R1 of the identified port number. The input port C outputs the received packet to the packet processing unit 130R1. The packet processing unit 130R1 stores the packet on the shared memory 131R1. Upon receiving the port number from the FDB 110R1, the packet processing unit 130R1 outputs the data of the packet to the output port A having the output port number. The output port A outputs the data of the packet received from the packet processing unit 130R1 (S41).

An upper stage port of the intermediate switch SWp, such as the input port B, may be connected to the output port A of the root switch SW1 identified in S41, and receives a transfer packet (S43). The input port B of the intermediate switch SWp outputs the destination address of the transfer packet to the FDB 110M1, and outputs the data of the packet to the packet processing unit 130M1 to store the data of the packet on the shared memory 131M1. The FDB 110M1 searches the address table with the destination address to identify a port number, and then notifies the packet processing unit 130M1 of the identified port number. The FDB 110M1 instructs the output port having the identified port number to output the transfer packet. The packet processing unit 130M1 outputs the data of the packet to the output port C having the notified port number, and the output port C outputs the data of the received packet to the packet processing unit 130M1 (S45).

An upstream port of the leaf switch SWm, such as the input port A, may be connected the output port C of the intermediate switch SWp and receives a transfer packet (S47). The input port A of the leaf switch SW1 outputs the destination address of the transfer packet to the FDB 110L1, and outputs the data of the packet to the packet processing unit 130L1 to store the data of the packet on the shared memory 131L1. The FDB 110L1 searches the address table with the destination address to identify a port number, and notifies the packet processing unit 130L1 of the identified port number. The FDB 110L1 instructs the output port having the identified port number to output the transfer packet. The packet processing unit 130L1 outputs the data of the packet to the output port C having the notified port number, and the output port C outputs the data of the packet received from the packet processing unit 130L1 (S49). The packet thus reaches the terminal device T(m-km) as a packet destination.

The FDB 110L1 of the leaf switch SW1 performs the address learning process on the transmission source address SA of the received packet (S51). The FDB 110L1 identifies a port number corresponding to the hash value $Hash_L(SA)$ calculated for the transmission source address, notifies the packet processing unit 130L1 of the identified port number, and notifies the output port B having the port number that the packet is the learning packet. The packet processing unit 130L1 outputs the data of the received packet stored on the shared memory 131L1 to the output port B having the port number of which the FDB 110L1 has notified the packet processing unit 130L1, and the output port B outputs the data of the packet as the learning packet (S53). The tag attachment unit 141B of the output port B attaches to the data of the received packet a tag indicating the learning packet, and then outputs the tag attached data. Alternatively, the method of the second embodiment may be applied.

The input port C of the intermediate switch SW1 may be connected to the output port B of the leaf switch SW1. Upon receiving a packet, the input port C of the intermediate switch SW1 determines that the packet is a learning packet (S55). The input port C outputs the transmission source address of the learning packet to the FDB 110M1. The FDB 110M1 calculates a hash value $Hash_{mid}(SA)$ of the received transmission source address, identifies a port number corresponding hash value $Hash_{mid}(SA)$, and notifies the packet processing unit 130M1 of the identified port number. The input port C outputs the received learning packet to the packet processing unit 130M1. The packet processing unit 130M1 stores the packet on the shared memory 131M1. Upon receiving the port number from the FDB 110M1, the packet processing unit 130M1 outputs the data of the packet to the output port A having the output port number. The output port A outputs the data of the learning packet received from the packet processing unit 130M1 (S57). The FDB 110M1 performs the address learning process on the received transmission source address (S59).

The input port B of the root switch SW2 may be connected to the output port A of the intermediate switch SW1. Upon receiving a packet, the input port B of the root switch SW2 determines that the packet is a learning packet (S61). The input port B outputs the transmission source address of the learning packet to the FDB 110R1. The FDB 110R1 performs the address learning process on the received transmission source address (S63). The FDB 110R1 does not transfer the packet.

Through the above-described process, the number of addresses one root switch is to learn is reduced in the three-stage switch network. Also, the number of addresses each intermediate switch is to learn is reduced. Workload is thus distributed among the switches.

The basic operation may remain unchanged even if the number of stages is increased to three or more. The number of stages of intermediate switches is simply increased. The operation of each intermediate switch has been described above. More specifically, if a learning packet is received from a downstream port connected to a lower stage switch, a hash value of a transmission source address is calculated in an exemplary hash function common to the lower stage, and the learning packet is then transferred from an output port corresponding to the hash value. On the other hand, if a transfer packet is received from a downstream port, a hash value of a destination address is calculated in accordance with the hash value common to the lower stage, and the transfer packet is transferred from an output port corresponding to the hash value. If a transfer packet is received from an upstream port connected to an upper stage switch, an address table is searched with a destination address of the transfer packet to identify an output port, and the transfer packet is transferred from the output port.

The seventh embodiment may be applicable to each of the first through sixth embodiments. If a tag attachment unit may be used in the output port of each of the leaf switches SW1-SWm as in the first embodiment, a tag detector may be used in the input port of each of the intermediate stage switches SW1 through SWp and the root switches SW1 through SWn. If a type determiner may be used in the input port of each of the root switches SW1 through SWn as in the second embodiment, a type determiner is also employed in the input port of each of the intermediate stage switches SW1 through SWp. The type determiner stores the hash function of a lower stage and the number of switches at own stage for calculation.

If the output port of each of the leaf switches SW1-SWm reduces the size of the learning packet in accordance with the third embodiment, the intermediate stage switches SW1 through SWp transfers the learning packet as is.

In exemplary fourth through sixth embodiments, the output port of each of the intermediate stage switches SW1 through SWp may modify the priority, limit the bandwidth, and reduce the number of redundant packets.

Figure 10:
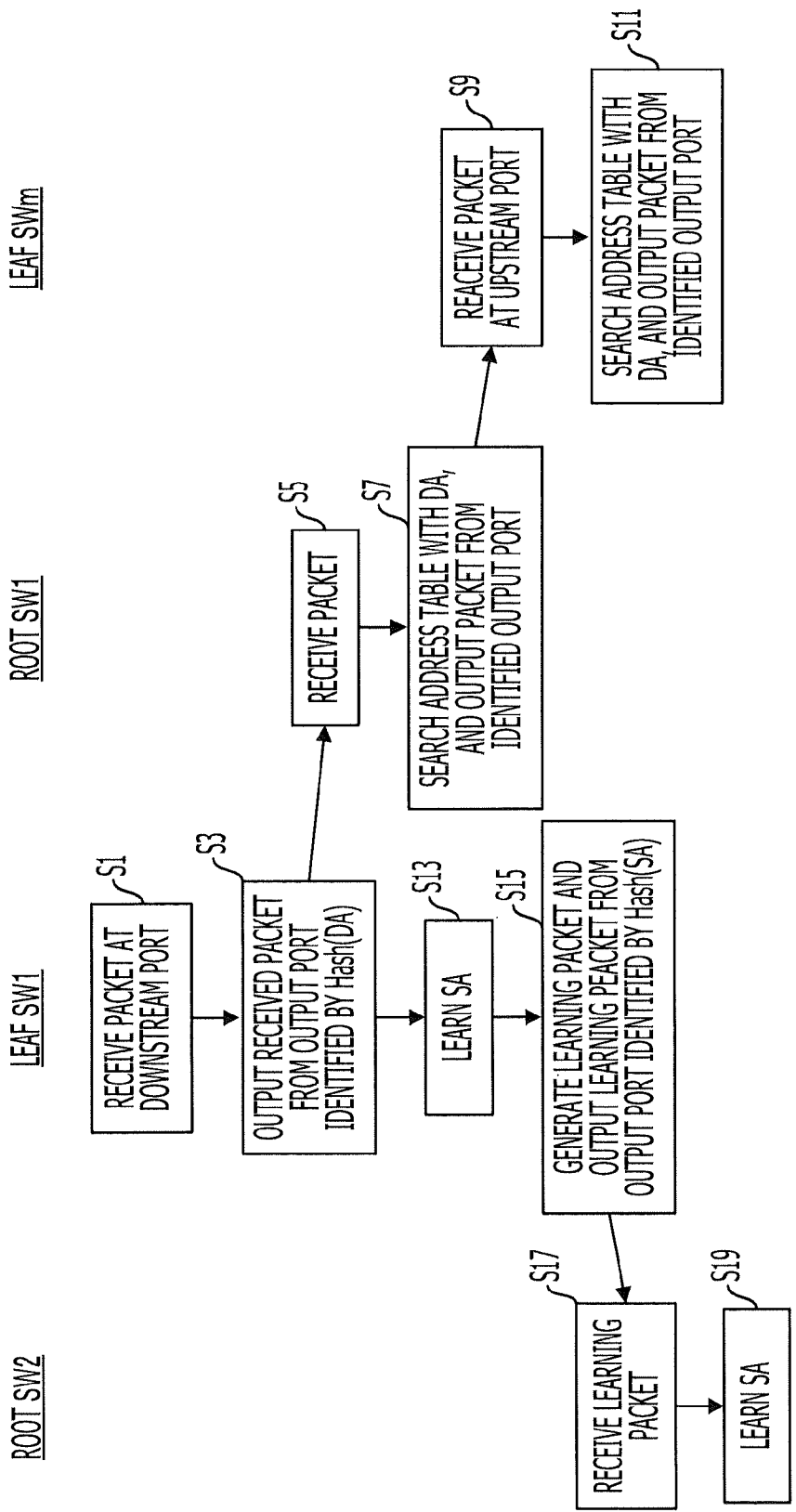
FIG. 10 illustrates an exemplary process flow of a network in accordance with the first embodiment.
Figure 16:
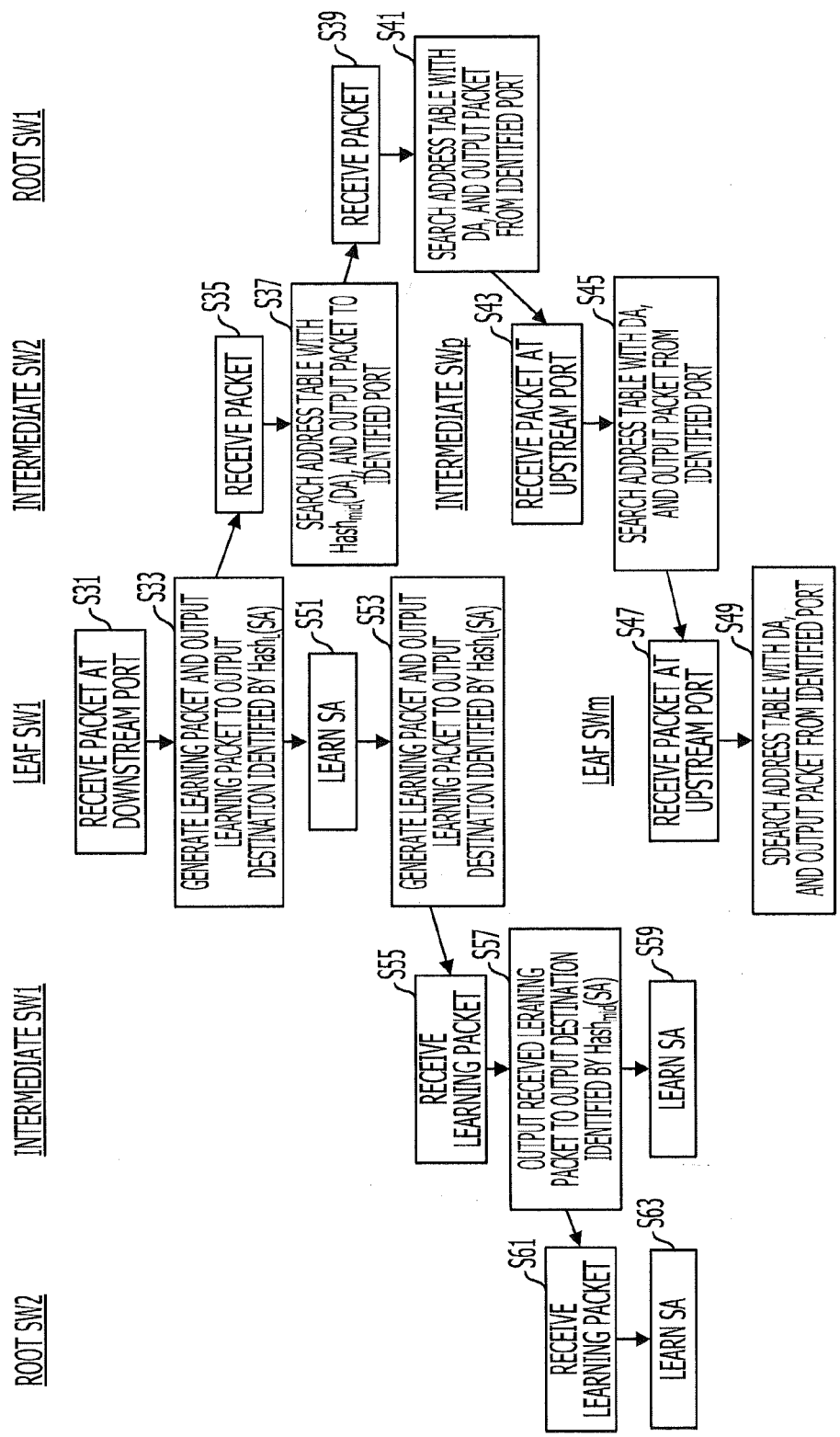
FIG. 16 illustrates a process flow of an entire network in seventh exemplary embodiment.

The process flows illustrated in FIGS. 10 and 16 are exemplary As long as process results remain the same, the order of processes may be modified. The processes may be concurrently performed in parallel. In particular, the outputting of the transfer packet and the outputting of the learning packet may be interchanged in order. The learning of the transmission source address may be performed in parallel with the outputting of each of the transfer packet and the learning packet.

Leaf switches SW1-SWm, the intermediate stage switches SW1 through SWp, and the root switches SW1 through SWn and the switching LSI thereof have been illustrated for exemplary purposes only. Actual circuit arrangements may be different from those illustrated. It is important that the above-described functions are performed.

Figure 17:
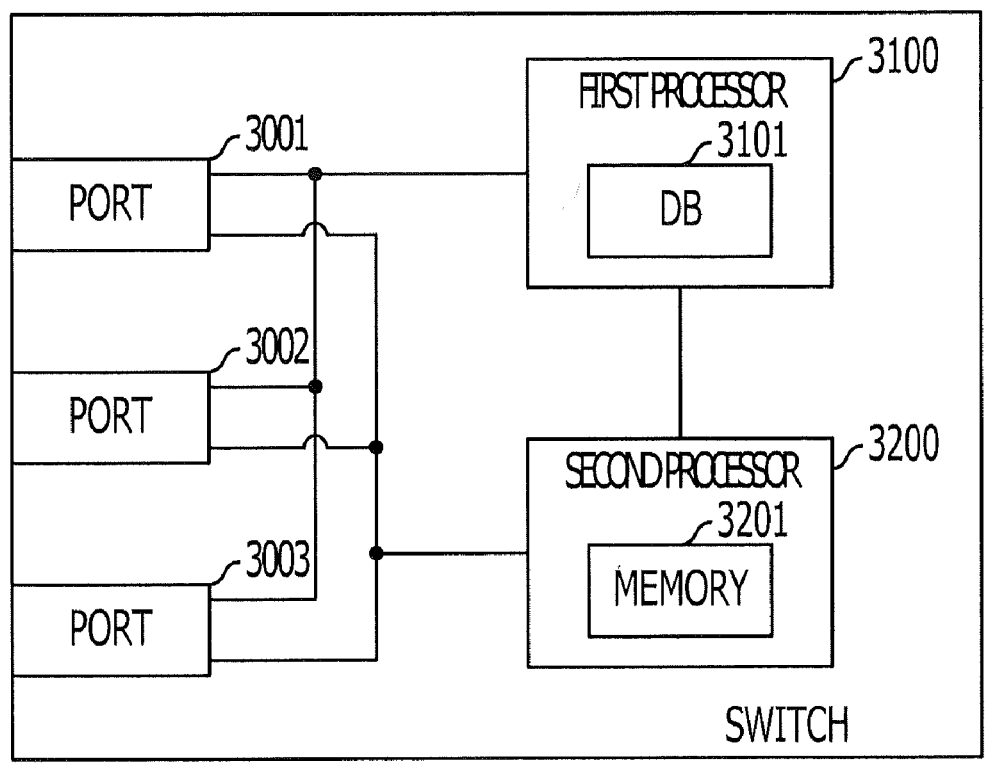
FIG. 17 illustrates a switch of the first through third exemplary embodiments.

In an exemplary first embodiment, a switch operating as a terminal switch (for example, a leaf SW in the embodiment in FIG. 17) in a multistage switch network, includes a plurality of ports (sets of input ports and output ports) 3001 through 3003, a first processor 3100 including a data base 3101 storing in a mapped state an identifier of a port and an address of a lower stage device connected to the port, the first processor processing a transmission source address and a destination address of a packet received by the port, and a second processor 3200 including a memory 3201 storing data of the packet received by the port, the second processor 3200 outputting, under the control of the first processor 3100, the data of the packet stored on the memory 3201 to the port. The first processor 3100 performs a learning process to register to the data base 3101 the transmission source address of the packet received from the lower stage device connected to the port. The first processor 3100 calculates based on a specific hash function a first hash value of the destination address of the packet received from the lower stage device connected to the port, identifies a first output destination port connected to a transfer destination switch corresponding to the first hash value, and causes the second processor 3200 to output the data of the packet to the first output destination port. The first processor 3100 further calculates in accordance with the specific hash function a second hash value of the transmission source address, identifies a second output destination port connected to an upper stage switch that corresponds to the second hash value and is to learn the transmission source address, and causes the second processor 3200 to output the data of the packet as a learning packet to the second output destination port.

The upper stage switch learning the transmission source address, namely, a switch transferring a packet to own switch, may be switched in accordance with the specific hash function. Even if the number of terminal devices under the switch increases, the number of addresses to be learned by one switch at the upper stage is decreased.

The second output destination port may attach, to the data of the packet, data indicating that the packet is the learning packet. With this arrangement, the upper stage switch can easily identify the learning packet.

One of the second output port and the second processor 3200 may delete at least part of a payload of the learning packet. By reducing the learning packet to a minimum permissible size, an amount of communication data expected to increase in the introduction of the learning packet is decreased.

The second output destination port may lower a priority of the learning packet. It is not a requirement that the learning packet be transmitted. If the number of transfer packets is large, a learning packet may be discarded. Similarly, the second output destination port may limit a bandwidth for a transmission of the learning packet.

The second output destination port may identify packets having the same transmission source address out of a plurality of learning packets, and may limit the number of output packets. It may be sufficient if the address learning process may be performed once with respect to the same transmission source address. If the packets remain accumulated, the number of output packets may be limited to one, for example.

The second processor 3200 may output once the data of the packet to the first output destination port if the first output destination port matches the second output destination port. Only one packet serving as a transfer packet and a learning packet may be output.

The first processor 3100 may identify a third output destination port by searching the data base 3101 with the destination address, and may cause the second processor 3200 to output the data of the packet to the third output destination port if the transfer destination switch corresponding to the first hash value is own switch. It is not necessary that a transfer packet intended for a terminal device under own switch be transmitted to an upper stage.

In an exemplary second embodiment, a second switch operating as a topmost stage switch (a root switch in the embodiment in FIG. 17) in a multistage switch network, includes a plurality of ports 3001 through 3003, a first processor 3100 including a data base 3101 storing in a mapped state an identifier of a port and an address of a device connected to one of a lower stage switch connected to the port and a switch lower than the lower stage switch, the first processor 3100 processing a transmission source address and a destination address of a packet received by the port, and a second processor 3200 including a memory 3201 storing data of the packet received by the port, the second processor 3200 outputting, under the control of the first processor 3100, the data of the packet stored on the memory 3201 to the port. Each of the ports determines whether the packet received from the lower stage switch connected to the port is a learning packet of the transmission source address or a transfer packet, outputs the transmission source address of the packet to the first processor 3100 in the case of the learning packet, and outputs the destination address of the packet to the first processor 3100 in the case of the transfer packet. The first processor 3100 performs a learning process to register to the data base 3101 the transmission source addresses received from the plurality of ports. The first processor 3100 identifies an output destination port by searching the data base 3101 with the destination addresses received from the plurality of ports to identify the output destination port, and causes the second processor 3200 to output the data of the packet to the output destination port.

The topmost stage switch simply learns only the transmission source address of the learning packet transmitted from a lower stage switch. If transmission destination switches of the learning packet are appropriately limited at a lower stage, the number of transmission source addresses to be registered on the data base is limited.

Each of the ports may determine whether the received packet includes data indicating the learning packet in order to determine whether the received packet is the learning packet or the transfer packet. The learning packet can thus be easily determined.

Each of the ports may calculate a first hash value of the transmission source address of the received packet based on a hash function used in a one-stage-lower switch, and may determine that the received packet is the learning packet if the first hash value is an identifier of own switch. Each of the ports may calculate a second hash value of the destination address of the received packet in accordance with the hash function, and determine that the received packet is the transfer packet if the second hash value is the identifier of own switch. In this case, the lower stage switch is free from an operation of reconstructing the packet.

In an exemplary third embodiment, a switch operating as an intermediate stage switch (an intermediate SW in the embodiment in FIG. 17) other than topmost and bottommost stage switches in a multistage switch network, includes a plurality of ports 3001 through 3003, a first processor 3100 including a data base 3101 storing in a mapped state an identifier of a port and an address of a device connected to one of a lower stage switch connected to the port and a switch lower than the lower stage switch, the first processor 3100 processing a transmission source address and a destination address of a packet received by the port, and a second processor 3200 including a memory 3201 storing data of the packet received by the port, the second processor 3200 outputting, under the control of the first processor 3100, the data of the packet stored on the memory 3201 to the port. Each of the ports determines whether the packet received from the lower stage switch connected to the port is a learning packet of the transmission source address or a transfer packet, outputs the transmission source address of the packet to the first processor 3100 in the case of the learning packet, and outputs the destination address of the packet to the first processor 3100 in the case of the transfer packet. The first processor 3100 performs a learning process to register to the data base 3101 the transmission source addresses received from the plurality of ports. The first processor 3100 calculates based on a specific hash function a first hash value of the destination addresses received from the plurality of ports, identifies a first output destination port connected to a transfer destination switch corresponding to the first hash value, and causes the second processor 3200 to output the data of the packet to the first output destination port. The first processor 3100 calculates a second hash function of the transmission source addresses received from the plurality of ports in accordance with the specific hash function, identifies a second output destination port connected to an upper stage switch that corresponds to the second hash value and is to learn the transmission source address, and causes the second processor 3200 to output the data of the packet to the second output destination port.

Intermediate stage switches may be introduced in three or more stage switch network system to reduce the number of transmission source addresses an upper stage switch needs to learn. The upper stage switch to which the learning packet is transmitted is switched in response to the second hash value of the transmission source address in accordance with the above-described hash function. The number of transmission source addresses each upper stage switch needs to learn is reduced accordingly. If the transmission destination of the learning packet is similarly switched in accordance with the hash value on a lower stage switch, the number of transmission source addresses to be learned by own switch is reduced accordingly.

Each of the ports may determine whether the received packet includes data indicating the learning packet in order to determine whether the received packet is the learning packet or the transfer packet. An upper stage switch can thus easily determine whether the packet is a learning packet or not.

Each of the ports may calculate a third hash value of the transmission source address of the received packet based on a second hash function used in a one-stage-lower switch, and determine that the received packet is the learning packet if the third hash value is an identifier of own switch. Each of the ports may calculate a fourth hash value of the destination address of the received packet in accordance with the second hash function, and determine that the received packet is the transfer packet if the fourth hash value is the identifier of own switch. With this arrangement, a lower stage switch may be free from an operation of reconstructing the packet.

Figure 18:
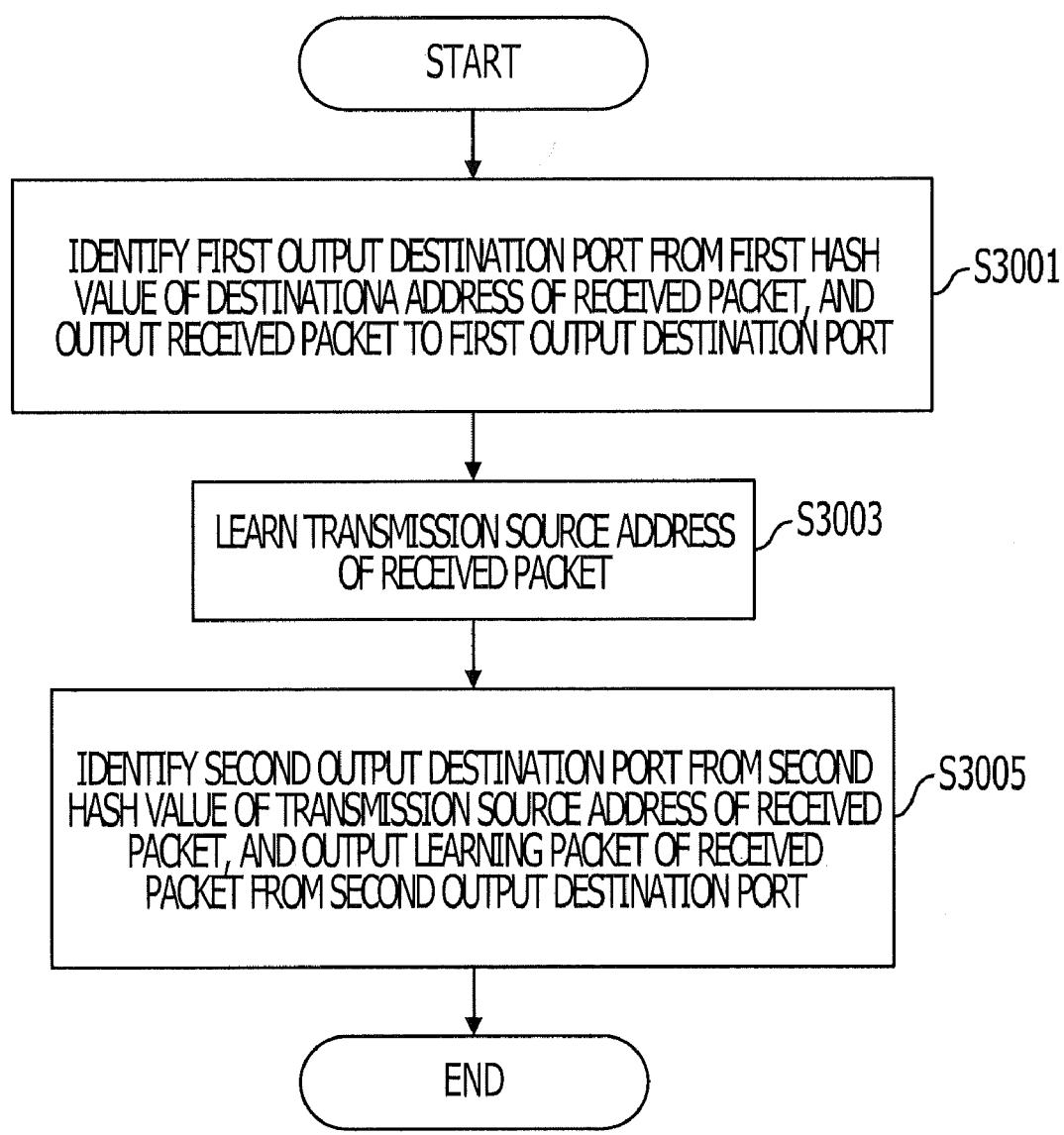
FIG. 18 illustrates a process flow of a process in accordance with a fourth exemplary embodiment.

In an exemplary fourth embodiment, an address learning method (FIG. 18) performed by a switch functioning as a terminal switch in a multistage switch network, includes S3001 of identifying a first output destination port connected to a transfer destination switch of a packet from a first hash value of a destination address of the packet based on a specific hash function if the packet is received from a lower stage device connected to the port to output the packet from the first output destination port, S3003 of performing a learning process to store, in a mapped state on a data base, a transmission source address of the packet, an identifier of the port, and an address of the lower stage device connected to the port, and S3005 of identifying a second output destination port connected to an upper stage switch that is to learn a transmission source address of the packet, from a second hash value of the transmission source address of the packet based on the specific hash function to output the learning packet from the second output destination port.

If the bottommost stage switch performs the above-described process, the number of transmission source addresses to be learned by an upper stage switch is reduced.

Figure 19:
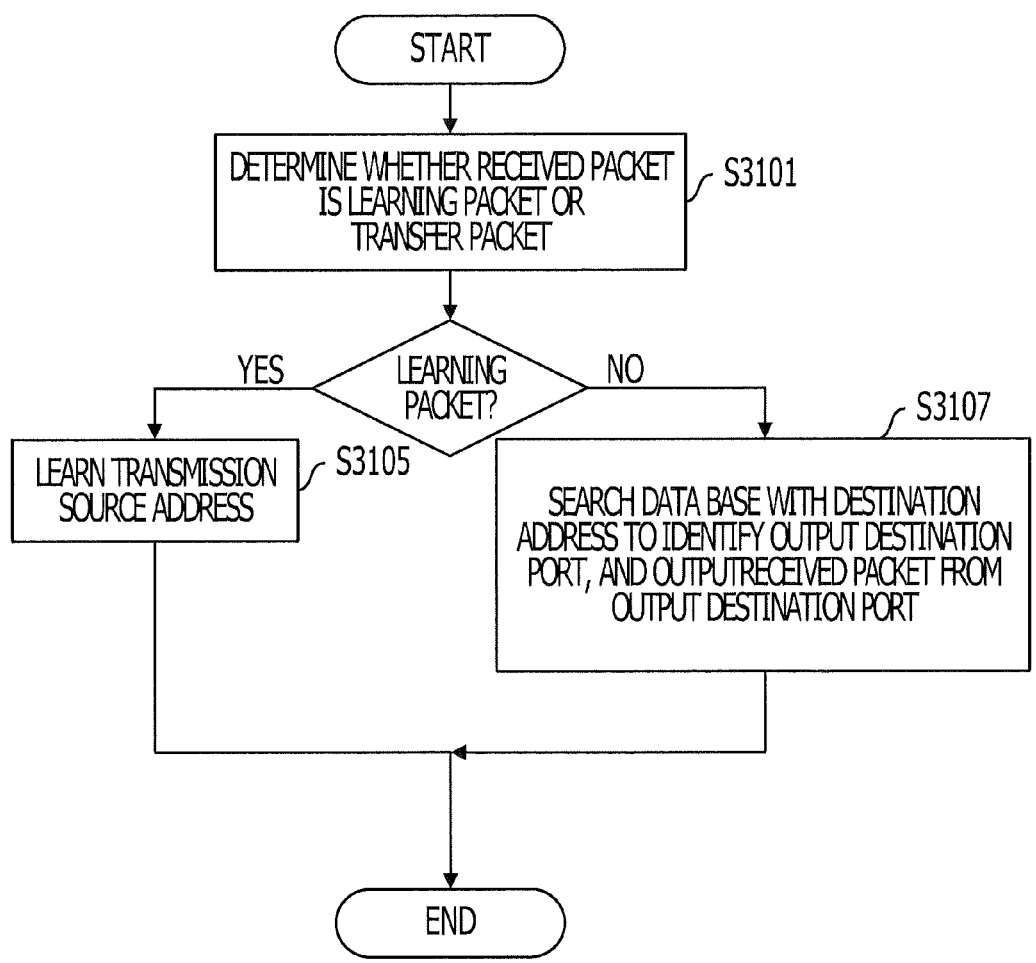
FIG. 19 illustrates a process flow of a process in accordance with a fifth exemplary embodiment.

In an exemplary fifth embodiment, an address learning method (FIG. 19) performed by a switch functioning as a topmost stage switch in a multistage switch network, includes S3101 of determining whether a packet received from a lower stage switch connected to a port is a learning packet of a transmission source address or a transfer packet, in the case of the learning packet of the transmission source address, S3105 of performing a learning process to register on a data base in a mapped state the transmission source address of the packet, an identifier of the port and an address of a device connected to one of the lower stage switch connected to the port and a switch lower than the lower stage switch, and in the case of the transfer packet, S3107 of identifying an output destination port by searching the data base with a destination address of the packet to output the transfer packet from the output destination port.

If transmission destination switches of the learning packet are appropriately limited in accordance with the hash function on a lower stage switch, the number of transmission source addresses to be learned is reduced.

In an exemplary sixth embodiment, an address learning method (FIG. 20) performed by a switch operating as an intermediate stage switch other than topmost and bottommost stage switches in a multistage switch network, includes S3201 of determining whether a packet received from a lower stage switch connected to a port is a learning packet of a transmission source address or a transfer packet, in the case of the learning packet of the transmission source address, S3205 of performing a learning process to register on a data base in a mapped state the transmission source address of the packet, an identifier of the port, and an address of a device connected to one of the lower stage switch connected to the port and a switch lower than the lower stage switch, in the case of the learning packet of the transmission source address, S3207 of calculating a first hash value of the transmission source address based on a specific hash function, identifying a first output destination port connected to an upper stage switch that corresponds to the first hash value and is to learn the transmission source address, and outputting the data of the packet from the first output destination, and in the case of the transfer packet, S3209 of calculating a second hash value of a destination address of the packet in accordance with the specific hash function, identifying a second output destination port connected to a transfer destination switch corresponding to the second hash value, and outputting the data of the packet from the second output destination port.

With this arrangement, the number of transmission source addresses to be learned by an upper stage switch is reduced. If transmission destination switches of the learning packet are appropriately distributed in accordance with the hash function on lower stage switches, the number of transmission source addresses to be learned by own switch is reduced.

A switching LSI having the above-described switching function may be manufactured and sold.

The same hash function may be prepared for the same stage switches, an upper stage switch learning a transmission source address of a packet is identified by a hash value of the transmission source address, and an upper stage switch transferring a packet is identified by a hash value of a destination address. A packet is output in a standard output procedure to the upper stage switch transferring the packet. A learning packet is generated and then transmitted to the upper switch performing the learning process. Upper stage switches learning the transmission source address of the packet, i.e., upper stage switches transferring the packet to own switch are narrowed to one switch in accordance with the hash function. The transmission source addresses are learned by all the upper stage switches in a distributed manner free from duplication. The number of addresses to be learned by a single switch is thus reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention. The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A switch operating in a multistage switch network, the switch comprising:
   a plurality of ports;
   a first processor to process a source address and a destination address of a packet received by an input port of the plurality of ports; and
   a memory to store data of the packet;
   a second processor to output, under the control of the first processor, the data of the packet stored on the memory,
   wherein the first processor calculates a first hash value of the source address of the packet in accordance with a specific hash function, identifies a first output port that is to learn the source address, the first output port being connected to a second switch that corresponds to the first hash value, and causes the second processor to output the data of the packet to the first output port.

2. The switch according to claim 1, wherein the first processor calculates a second hash value of the destination address of the packet in accordance with the specific hash function, identifies a second output port connected to a switch corresponding to the second hash value, and causes the second processor to output the data of the packet to the second output port.

3. The switch according to claim 2, wherein the second processor outputs the data of the packet to the second output port once if the second output port matches the first output port.

4. The switch according to claim 1, further comprising:
   a data base to store an identifier of a received port that received a packet and an address of a device, the device being any one of a device connected to the received port, a device connected to a lower stage switch connected to the received port, and a device connected to a switch downstream from the lower stage switch,
   wherein the first processor performs a learning process to register to the data base the source address of the packet received from the input port.

5. The switch according to claim 4, wherein each of the plurality of ports determines whether the received packet is a learning packet of the source address or a transfer packet, outputs the source address of the received packet to the first processor in the case of the learning packet, and outputs the destination address of the received packet to the first processor in the case of the transfer packet.

6. The switch according to claim 5, wherein the first output port attaches, to the data of the packet, a tag indicating that the packet is the learning packet.

7. The switch according to claim 5, wherein either the first output port or the second processor deletes at least part of a payload of the learning packet.

8. The switch according to claim 5, wherein the first output port assigns a lower priority to the learning packet.

9. The switch according to claim 5, wherein the first output port suspends output of the learning packet or deletes the learning packet when a bandwidth of a link to an upper stage switch is restricted.

10. The switch according to claim 5, wherein the first output port limits the number of packets having the same source address out of a plurality of learning packets.

11. The switch according to claim 5, wherein the first processor identifies a third output port by searching the data base with the destination address and causes the second processor to output the data of the packet to the third output port if the transfer destination switch corresponding to the first hash value is associated with the third output port.

12. The switch according to claim 5, wherein each of the plurality of ports determines whether the received packet includes a tag indicating the learning packet.

13. The switch according to claim 5, wherein each of the plurality of ports calculates a third hash value of the source address of the received packet in accordance with a specific hash function used in a one-stage-lower switch to perform the learning process if the third hash value is an identifier of a switch associated with the plurality of ports, and
   calculates a fourth hash value of the destination address of the received packet in accordance with the hash function used in a one-stage-lower switch to transfer the received packet if the fourth hash value is the identifier of the switch associated with the plurality of ports.

14. An address learning method comprising:
   processing a source address and a destination address of a packet received by an input port of a plurality of ports,
   calculating a hash value of the source address of the packet in accordance with a specific hash function,
   identifying a first output port that is to learn the source address, the first output port being connected to a second switch that corresponds to the hash value, and
   outputting the data of the packet to the first output port.

15. A switch in a multistage switch network, the switch comprising:
   a plurality of ports;
   a data base to store an identifier of a received port that received a packet and an address of a device connected to one of a lower stage switch connected to the received port and a switch downstream from the lower stage switch;

a first processor to process a source address and a destination address of a packet received by an input port of the plurality of ports;
a memory to store data of the packet received by the input port; and
a second processor to output, under the control of the first processor, the data of the packet stored on the memory,
wherein each of the plurality of ports
determines whether a packet received from the lower stage switch connected to the input port is a learning packet of the source address or a transfer packet,
outputs the source address of the received packet to the first processor in the case of the learning packet, and
outputs the destination address of the received packet to the first processor in the case of the transfer packet,
wherein the first processor
performs a learning process to register to the data base the source address of the packet received from the input port,
identifies an output destination port by searching the data base with the destination address of the packet received from the input port, and
causes the second processor to output the data of the packet to the output destination port.

16. An intermediate stage switch in a multistage switch network, the multistage switch network including an upper stage switch in a stage upstream from the intermediate stage switch, the multistage switch network including a lower stage switch in a stage downstream from the intermediate stage switch, the intermediate stage switch comprising:
 a plurality of ports;
 a data base to store an identifier of a received port that received a packet and an address of a device connected to one of a lower stage switch connected to the received port and a switch downstream from the lower stage switch;
a first processor to process a source address and a destination address of a packet received by an input port of the plurality of ports;
a memory to store data of the packet received by the input port; and
a second processor to output, under the control of the first processor, the data of the packet stored on the memory,
wherein each of the plurality of ports
determines whether a packet received from the lower stage switch connected to the input port is a learning packet of the source address or a transfer packet,
outputs the source address of the received packet to the first processor in the case of the learning packet, and
outputs the destination address of the received packet to the first processor in the case of the transfer packet,
wherein the first processor performs a learning process to register to the data base the source addresses of the packet received from the plurality of ports,
calculates a first hash value of the destination addresses of the packet received from the input port in accordance with a specific hash function,
identifies a first output destination port connected to a destination switch corresponding to the first hash value, and
causes the second processor to output the data of the packet to the first output destination port,
calculates a second hash value of the source address of the packet received from the input port in accordance with the specific hash function,
identifies a second output destination port connected to the upper stage switch that corresponds to the second hash value and that is to learn the source address, and
causes the second processor to output the data of the packet to the second output destination port.

* * * * *